(12) United States Patent
Katis et al.

(10) Patent No.: US 8,509,123 B2
(45) Date of Patent: *Aug. 13, 2013

(54) COMMUNICATION APPLICATION FOR CONDUCTING CONVERSATIONS INCLUDING MULTIPLE MEDIA TYPES IN EITHER A REAL-TIME MODE OR A TIME-SHIFTED MODE

(71) Applicant: Voxer IP LLC, San Francisco, CA (US)

(72) Inventors: Thomas E. Katis, Jackson, WY (US); James T. Panttaja, San Francisco, CA (US); Mary G. Panttaja, San Francisco, CA (US); Matthew J. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/782,834

(22) Filed: Mar. 1, 2013

(65) Prior Publication Data
US 2013/0176911 A1 Jul. 11, 2013

Related U.S. Application Data

(63) Continuation of application No. 13/651,339, filed on Oct. 12, 2012, now Pat. No. 8,412,845, which is a continuation of application No. 12/552,985, filed on Sep. 2, 2009, now Pat. No. 8,321,582, which is a continuation-in-part of application No. 12/028,400, filed on Feb. 8, 2008, now Pat. No. 8,180,029, and a continuation-in-part of application No. 12/192,890, filed on Aug. 15, 2008, now Pat. No. 8,090,687.

(60) Provisional application No. 61/157,108, filed on Mar. 3, 2009, provisional application No. 61/228,203, filed on Jul. 24, 2009.

(51) Int. Cl.
*H04B 1/56* (2006.01)

(52) U.S. Cl.
USPC ........... 370/276; 370/260; 370/468; 370/470; 370/395.52; 370/494; 709/223; 709/234; 709/235; 455/456.1; 455/456.3; 455/556.2

(58) Field of Classification Search
USPC ................... 370/260, 276, 353–356, 395.52, 370/468, 470, 494; 709/223, 234, 235; 455/456.1, 456.2, 456.3, 556.1, 556.2
See application file for complete search history.

(56) References Cited

U.S. PATENT DOCUMENTS

| | | | |
|---|---|---|---|
| 4,807,224 A | 2/1989 | Naron et al. | |
| 5,117,422 A | 5/1992 | Hauptschein et al. | |

(Continued)

FOREIGN PATENT DOCUMENTS

| | | |
|---|---|---|
| JP | 2002-176510 | 6/2002 |
| WO | WO 03/073642 | 9/2003 |

(Continued)

OTHER PUBLICATIONS

"dircproxy," http://home.pcisys.net/~tbc/hacks/dircproxy.htm, Downloaded on Sep. 26, 2008, 1 page.

(Continued)

*Primary Examiner* — Andrew Lai
*Assistant Examiner* — Andrew C Lee
(74) *Attorney, Agent, or Firm* — Beyer Law Group LLP

(57) ABSTRACT

A communication application configured to support a conversation among participants over a communication network. The communication application is configured to (i) support one or more media types within the context of the conversation, (ii) interleave the one or more media types in a time-indexed order within the context of the conversation, (iii) enable the participants to render the conversation including the interleaved one or more media types in either a real-time rendering mode or time-shifted rendering mode, and (iv) seamlessly transition the conversation between the two modes so that the conversation may take place substantially live when in the real-time rendering mode or asynchronously when in the time-shifted rendering mode.

30 Claims, 17 Drawing Sheets

(56) References Cited

U.S. PATENT DOCUMENTS

| | | | |
|---|---|---|---|
| 5,283,818 A | 2/1994 | Klausner et al. | |
| 5,375,018 A | 12/1994 | Klausner et al. | |
| 5,390,236 A | 2/1995 | Klausner et al. | |
| 5,487,167 A | 1/1996 | Dinallo et al. | |
| 5,524,140 A | 6/1996 | Klausner et al. | |
| 5,572,576 A | 11/1996 | Klausner et al. | |
| 5,692,213 A | 11/1997 | Goldberg et al. | |
| 5,717,869 A | 2/1998 | Moran et al. | |
| 5,734,963 A | 3/1998 | Fitzgerald et al. | |
| 5,737,011 A | 4/1998 | Lukacs | |
| 5,918,158 A | 6/1999 | LaPorta et al. | |
| 5,963,551 A | 10/1999 | Minko | |
| 5,970,122 A | 10/1999 | LaPorta et al. | |
| 6,037,932 A | 3/2000 | Feinleib | |
| 6,092,120 A | 7/2000 | Swaminathan et al. | |
| 6,104,757 A | 8/2000 | Rhee | |
| 6,175,619 B1 | 1/2001 | DeSimone | |
| 6,233,389 B1 | 5/2001 | Barton et al. | |
| 6,262,994 B1 | 7/2001 | Dirschedl et al. | |
| 6,378,035 B1 | 4/2002 | Parry et al. | |
| 6,480,783 B1 | 11/2002 | Myr | |
| 6,507,586 B1 | 1/2003 | Satran et al. | |
| 6,564,261 B1 | 5/2003 | Gudjonsson et al. | |
| 6,577,599 B1 | 6/2003 | Gupta et al. | |
| 6,580,694 B1 | 6/2003 | Baker | |
| 6,671,732 B1 | 12/2003 | Weiner | |
| 6,717,925 B1 | 4/2004 | Leppisaari et al. | |
| 6,721,703 B2 | 4/2004 | Jackson et al. | |
| 6,791,949 B1 | 9/2004 | Ryu et al. | |
| 6,807,565 B1 | 10/2004 | Dodrill et al. | |
| 6,807,578 B2 | 10/2004 | Satran et al. | |
| 6,829,473 B2 | 12/2004 | Raman et al. | |
| 6,834,039 B1 | 12/2004 | Kelly et al. | |
| 6,850,965 B2 | 2/2005 | Allen | |
| 6,912,544 B1 | 6/2005 | Weiner | |
| 6,931,114 B1 | 8/2005 | Martin | |
| 6,970,926 B1 | 11/2005 | Needham et al. | |
| 6,973,309 B1 | 12/2005 | Rygula et al. | |
| 6,993,009 B2 | 1/2006 | Kelly et al. | |
| 6,996,624 B1 | 2/2006 | LeCroy et al. | |
| 7,002,913 B2 | 2/2006 | Huang et al. | |
| 7,039,040 B1 | 5/2006 | Burg | |
| 7,039,675 B1 | 5/2006 | Kato | |
| 7,047,030 B2 | 5/2006 | Forsyth | |
| 7,111,044 B2 | 9/2006 | Lee | |
| 7,117,521 B2 | 10/2006 | Puthiyedath | |
| 7,139,371 B2 | 11/2006 | McElvaney | |
| 7,171,491 B1 | 1/2007 | O'Toole et al. | |
| 7,187,941 B2 | 3/2007 | Siegel | |
| 7,218,709 B2 | 5/2007 | Garg et al. | |
| 7,218,943 B2* | 5/2007 | Klassen et al. | 455/466 |
| 7,233,589 B2 | 6/2007 | Tanigawa et al. | |
| 7,236,738 B2 | 6/2007 | Settle | |
| 7,240,105 B2 | 7/2007 | Satran et al. | |
| 7,304,951 B2 | 12/2007 | Rhee | |
| 7,305,438 B2 | 12/2007 | Christensen et al. | |
| 7,313,593 B1 | 12/2007 | Pulito et al. | |
| 7,349,871 B2 | 3/2008 | Labrou et al. | |
| 7,382,881 B2 | 6/2008 | Uusitalo et al. | |
| 7,403,775 B2 | 7/2008 | Patel et al. | |
| 7,626,951 B2 | 12/2009 | Croy et al. | |
| 7,870,211 B2* | 1/2011 | Pascal et al. | 709/206 |
| 7,949,873 B2 | 5/2011 | Schwartz et al. | |
| 7,987,409 B2* | 7/2011 | Suh et al. | 714/774 |
| 8,027,276 B2* | 9/2011 | Nierhaus | 370/260 |
| 8,108,144 B2* | 1/2012 | Forstall et al. | 701/426 |
| 8,140,392 B2* | 3/2012 | Altberg et al. | 705/14.69 |
| 8,171,084 B2 | 5/2012 | Walter et al. | |
| 8,280,434 B2* | 10/2012 | Garg | 455/556.1 |
| 8,385,898 B2* | 2/2013 | Mahowald | 455/415 |
| 2001/0018769 A1 | 8/2001 | Matsui | |
| 2001/0025377 A1 | 9/2001 | Hinderks | |
| 2002/0124258 A1 | 9/2002 | Fritsch | |
| 2002/0128029 A1 | 9/2002 | Nishikawa et al. | |
| 2002/0150094 A1 | 10/2002 | Cheng et al. | |
| 2002/0154745 A1 | 10/2002 | Shtivelman | |
| 2002/0159600 A1 | 10/2002 | Weiner | |
| 2002/0184368 A1 | 12/2002 | Wang | |
| 2003/0027566 A1 | 2/2003 | Weiner | |
| 2003/0028632 A1 | 2/2003 | Davis | |
| 2003/0064716 A1 | 4/2003 | Gailey et al. | |
| 2003/0099198 A1 | 5/2003 | Kiremidjian et al. | |
| 2003/0126162 A1 | 7/2003 | Yohe et al. | |
| 2003/0186722 A1 | 10/2003 | Weiner | |
| 2004/0017905 A1 | 1/2004 | Warrier et al. | |
| 2004/0019539 A1 | 1/2004 | Raman et al. | |
| 2004/0045036 A1 | 3/2004 | Terasaki | |
| 2004/0074448 A1 | 4/2004 | Bunt | |
| 2004/0090959 A1 | 5/2004 | Cinghita et al. | |
| 2004/0095900 A1 | 5/2004 | Siegel | |
| 2004/0117722 A1 | 6/2004 | Harada | |
| 2004/0192353 A1 | 9/2004 | Mason et al. | |
| 2004/0192378 A1 | 9/2004 | Wulkan | |
| 2004/0252679 A1 | 12/2004 | Williams et al. | |
| 2004/0255148 A1 | 12/2004 | Monteiro et al. | |
| 2004/0258220 A1 | 12/2004 | Levine et al. | |
| 2005/0021819 A1 | 1/2005 | Kilkki | |
| 2005/0025308 A1 | 2/2005 | Tischer et al. | |
| 2005/0030932 A1 | 2/2005 | Kelly et al. | |
| 2005/0037706 A1 | 2/2005 | Settle | |
| 2005/0053033 A1 | 3/2005 | Kelly et al. | |
| 2005/0102358 A1 | 5/2005 | Gold et al. | |
| 2005/0135333 A1 | 6/2005 | Rojas | |
| 2005/0143104 A1* | 6/2005 | Kim | 455/466 |
| 2005/0144247 A1 | 6/2005 | Christensen et al. | |
| 2005/0160345 A1 | 7/2005 | Walsh et al. | |
| 2005/0202807 A1 | 9/2005 | Ayyasamy | |
| 2005/0207487 A1 | 9/2005 | Monroe | |
| 2005/0215228 A1 | 9/2005 | Fostick et al. | |
| 2005/0220137 A1 | 10/2005 | Prigent et al. | |
| 2005/0259682 A1 | 11/2005 | Yosef et al. | |
| 2005/0288101 A1 | 12/2005 | Lockton et al. | |
| 2006/0007943 A1 | 1/2006 | Fellman | |
| 2006/0045038 A1 | 3/2006 | Kay et al. | |
| 2006/0059267 A1 | 3/2006 | Cugi et al. | |
| 2006/0059342 A1 | 3/2006 | Medvinsky et al. | |
| 2006/0093304 A1 | 5/2006 | Battey et al. | |
| 2006/0107285 A1 | 5/2006 | Medvinsky | |
| 2006/0146822 A1 | 7/2006 | Kolakowski et al. | |
| 2006/0187897 A1 | 8/2006 | Dabbs et al. | |
| 2006/0189305 A1 | 8/2006 | Ando et al. | |
| 2006/0212582 A1 | 9/2006 | Gupta et al. | |
| 2006/0212592 A1 | 9/2006 | Gupta et al. | |
| 2006/0224748 A1 | 10/2006 | Gupta et al. | |
| 2006/0244588 A1 | 11/2006 | Hannah et al. | |
| 2006/0245367 A1 | 11/2006 | Jeffery et al. | |
| 2006/0253599 A1 | 11/2006 | Monteiro et al. | |
| 2006/0268750 A1 | 11/2006 | Weiner | |
| 2006/0274698 A1 | 12/2006 | Twitchell | |
| 2006/0276714 A1 | 12/2006 | Holt et al. | |
| 2006/0282544 A1 | 12/2006 | Monteiro et al. | |
| 2006/0288391 A1 | 12/2006 | Puthiyedath | |
| 2006/0294259 A1 | 12/2006 | Matefi et al. | |
| 2007/0001869 A1 | 1/2007 | Hunzinger | |
| 2007/0180032 A1 | 8/2007 | Pearson | |
| 2007/0182819 A1 | 8/2007 | Monroe | |
| 2007/0207785 A1 | 9/2007 | Chatterjee et al. | |
| 2008/0000979 A1 | 1/2008 | Poisner | |
| 2008/0002621 A1 | 1/2008 | Ginzburg et al. | |
| 2008/0002691 A1 | 1/2008 | Qi et al. | |
| 2008/0055269 A1* | 3/2008 | Lemay et al. | 345/173 |
| 2008/0086700 A1 | 4/2008 | Rodriguez et al. | |
| 2008/0095338 A1 | 4/2008 | Cosky et al. | |
| 2008/0123627 A1 | 5/2008 | Moreman et al. | |
| 2008/0134054 A1 | 6/2008 | Clark et al. | |
| 2008/0165148 A1* | 7/2008 | Williamson et al. | 345/173 |
| 2008/0205444 A1 | 8/2008 | Campbell et al. | |
| 2009/0063698 A1 | 3/2009 | Xu et al. | |
| 2009/0175425 A1 | 7/2009 | Lee | |

FOREIGN PATENT DOCUMENTS

| | | |
|---|---|---|
| WO | WO 2006/114673 | 11/2006 |
| WO | WO 2007/026320 | 3/2007 |

OTHER PUBLICATIONS

Apple Inc., "iPhone User's Guide," http://manuals.info.apple.com/en_US/iPhone_User_Guide.pdf, Downloaded on Oct. 3, 2008, 154 pages.

Brandx.net, "Using Talk," http://www.brandx.net/support/usingtelnet/talk.shtml, Downloaded on Sep. 19, 2008, 2 pages.

Businesswire.com "LignUp 4.0 Delivers Industry's Most Comprehensive Suite of Communications Web Services," http://www.businesswire.com/portal/site/google/index.jsp?ndmViewId=news_view& newsId=20070430005498&newsLang=en, Downloaded on Nov. 21, 2008, 10 pages.

Calore, Michael, "SpinVox Moves Into VoIP, Brings Voice-to-Text to Skype Users," Monkey_Bites, http://blog.wired.com/monkeybites/2007/08/spinvox-moves-i.html, Downloaded on Oct. 3, 2008, 4 pages.

Cardei et al., "MAC Layer QoS Support for Wireless Networks of Unmanned Air Vehicles," Proceedings of the 37th Hawaii International Conference on System Sciences—2004, Jan. 5-8, 2004 Page(s): 9 pp.

Charny, Ben, "Nextel pushes new 'push to talk' features," URL: http://news.zdnet.com/2100-9584_22-134945.html, Mar 18, 2004, 3 pages.

Chen et al., "An Adaptive Multimedia Transmission Protocol for Distributed Multimedia Applications," Proceedings of the 5th International Workshop on Multimedia Network Systems and Applications (MNSA'2003), in conjunction with The 23rd International Conference on Distributed Computing Systems (ICDCS-2003), 6 pages.

Dannen, Chris, "Technology: The Skype Mobile Phone Will Blow Your Mind," Dec. 18, 2007, URL: http://www.fastcompany.com/blog/chris-dannen/lab/technology-skype-mobile-phone-will-blow-your-mind, 2 pages.

Erwu et al., "Packet-late indication based (PLIB): adaptive jitter buffer," ACM International Conference Proceeding Series; vol. 58, Proceedings of the winter international symposium on Information and communication technologies, Cancun, Mexico, Session: Performance, reliability, and quality of service, pp. 1-5 Year of Publication: 2004.

FAQS.org, "RFC1644—T/TCP—TCP Extensions for Transactions Functional S," http://www.faqs.org/rfcs/rfc1644.html, Downloaded on Sep. 19, 2008, 26 pages.

FluidVoice "Overview of FluidVoice," http://viral.media.mit.edu/wiki/tiki-index.php?page=FluidVoice, Downloaded on Sep. 16, 2008, 2 pages.

GrandCentral.com, "Call Record," http://www.grandcentral.com/howitworks/call_record, Downloaded on Sep. 26, 2008, 1 page.

GrandCentral.com, "One Voicemail Box," http://www.grandcentral.com/home/one_voicemail, Downloaded on Sep. 26, 2008, 1 page.

GrandCentral.com, "So Many Features, You Won't Believe it," http://www.grandcentral.com/support/howitworks/, Downloaded on Sep. 26, 2008, 1 page.

GrandCentral.com, "Voicemail forwarding," http://www.grandcentral.com/howitworks/voicemail_forwarding, Downloaded on Sep. 26, 2008, 1 page.

Henshall, Stuart, "HotRecorder—Record Skype Calls," Skype Journal, URL: http://skypejournal.com/blog/archives/2005/03/hotrecorder_rec.php, Mar. 25, 2005, 11 pages.

IRCHelp.org, "An IRC Tutorial," http://www.irchelp.org/irchelp/irctutorial.html, Downloaded on Sep. 26, 2008, 14 pages.

Kadoink.com, "Get a Widget," http://www.kadoink.com/index.cfm?action=getWidgets, Downloaded on Sep. 19, 2008, 3 pages.

Krishnan et al., "EVRC-Wideband: The New 3GPP2 Wideband Vocoder Standard," IEEE International Conference on Acoustics, Speech and Signal Processing, 2007. ICASSP 2007, Publication Date: Apr. 15-20, 2007, vol. 2, on pp. II-333-II-336, Honolulu, HI.

Layton, Julia, "How Slingbox Works," Jan. 4, 2006, HowStuffWorks.com, http://electronics.howstuffworks.com/slingbox.htm, 9 pages.

LignUp.com, "LignUp Communications Applications Server," http://www.lignup.com/platform/index.html, Downloaded on Sep. 19, 2008, 1 page.

Network Dictionary, "Instant Message (IM) Technology Overview," http://www.networkdictionary.com/networking/im.php, Downloaded on Sep. 16, 2008, 2 pages.

Nikotalkie.com, "Nikotalkie—Home," http://www.nikotalkie.com/, Downloaded on Sep. 19, 2008, 2 pages.

Nikotel.com, "Click-Pop-Talk WebStart Phone," http://www.nikotel.com/nikotel-click-pop-talk-java-phone.html, Downloaded on Sep. 19, 2008, 1 page.

Notaras, George, "dircproxy IRC Proxy," http://www.g-loaded.eu/2007/02/01/dircproxy-irc-proxy/, Downloaded on Sep. 26, 2008, 4 pages.

Pash, Adam, "Consolidate Your Phones with GrandCentral," http://techgroup.groups.vox.com/library/post/6a00cd978d0ef7f9cc00e398b8ff7a0002.html, Downloaded on Sep. 19, 2008, 5 pages.

Patel, Nilay, "Apple patent reveals data-to-voice translation system for cellphones," Jul. 28, 2007, URL: http://www.engadget.com/2007/07/28/apple-patent-reveals-data-to-voice-translation-system-for-cellph/, 5 pages.

Piecuch et al., "A Selective Retransmission Protocol for Multimedia on the Internet," In Proceedings of SPIE Multimedia Systems and Applications, Nov. 2000, Boston MA, USA, 12 pages.

Qiao et al., "SCTP Performance Issue on Path Delay Differential," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.

Ramo et al., "On comparing speech quality of various narrow- and wideband speech codecs," Proceedings of the Eighth International Symposium on Signal Processing and Its Applications, 2005. Publication Date: Aug. 28-31, 2005, vol. 2, on pp. 603-606.

Rey et al., "I-D ACTION:draft-ietf-avt-rtp-retransmission-09.txt," Aug. 5, 2003, http://osdir.com/ml/ietf.avt/2003-08/msg00003.html, Downloaded on Sep. 19, 2008, 2 pages.

Ribbit.com, "Amphibian," http://www.ribbit.com/everyday/, Downloaded on Sep. 26, 2008, 1 page.

Ribbit.com, "Enhanced Visual Voicemail," http://www.ribbit.com/everyday/tour/enhanced_visual_voicemail.php, Downloaded on Sep. 26, 2008, 2 pages.

Ribbit.com, "What is Ribbit? Features," http://www.ribbit.com/platform/features.php, Downloaded on Sep. 26, 2008, 1 page.

Ribbit.com, "What is Ribbit? Overview," http://www.ribbit.com/platform/index.php, Downloaded on Sep. 26, 2008, 1 page.

Ribbit.com, "What is Ribbit? Voice Architecture," http://www.ribbit.com/platform/architecture.php, Downloaded on Sep. 26, 2008, 2 pages.

Saito et al., "IP Packet Loss Compensation Scheme with Bicast and Forwarding for Handover in Mobile Communications," 2006 IEEE 17th International Symposium on Personal, Indoor and Mobile Radio Communications, Sep. 2006, pp. 1-5, Helsinki.

Skype.com, "Making calls is just the start," URL: http://www.skype.com/features/, Downloaded on Sep. 16, 2008, 2 pages.

Spinvox.com, "Home Page," http://www.spinvox.com/, Downloaded on Sep. 26, 2008, 3 pages.

Spinvox.com, "How Does it Work?," http://www.spinvox.com/how_it_works.html, Downloaded on Sep. 19, 2008, 2 pages.

Swissvoice.net, "PSTN," http://www.swissvoice.net/ww/htm_ww/08_technology/content_pstn.html, Downloaded on Sep. 19, 2008, 3 pages.

Tektronix, "VOIP Technology Overview; Protocols, Convergence, Testing," http://www.tektronics.com/voip, May 12, 2006.

The Jabber Extensible Communications Platform™, "Products // Jabber XCP," URL: http://www.jabber.com/CE/JabberXCP, Downloaded on Sep. 16, 2008, 2 pages.

ThunkDifferent.com, "YouMail vs. Google Grandcentral Voice Mail Service," http://thunkdifferent.com/2007/10/11/youmail-vs-google-grandcentral-voice-mail-service/, Downloaded on Oct. 3, 2008, 6 pages.

VOIP-News.com, "Company Profile, LignUp," http://www.voip-news.com/vendors/lignup/, Downloaded on Dec. 5, 2008, 6 pages.

WildBooks, "Internet Technologies/IRC," http://en.wikibooks.org/wiki/Internet_Technologies/IRC, Downloaded on Sep. 19, 2008, 4 pages.

WikiPedia—The Free Encyclopedia, "E-mail," http://en.wikipedia.org/wiki/E-mail, Downloaded on Sep. 19, 2008, 8 pages.

WikiPedia—The Free Encyclopedia, "*Internet Relay Chat*," http://en.wikipedia.org/wiki/Internet_Relay_Chat, Downloaded on Oct. 3, 2008, 11 pages.
WikiPedia—The Free Encyclopedia, "*Spinvox*," http://en.wikipedia.org/wiki/Spinvox, Downloaded on Sep. 26, 2008, 1 page.
WikiPedia—The Free Encyclopedia, "*TiVo*", http://en.wikipedia.org/wiki/TiVo, Downloaded on Sep. 16, 2008, 6 pages.
Yavuz et al., "*VoIP over cdma2000 1xEV-DO Revision A*," IEEE Communications Magazine, Feb. 2006, pp. 88-95.
HotRecorder.com, "*Features*," http://www.hotrecorder.com/music_features.asp, downloaded on Sep. 26, 2008, 1 page.
HotRecorder.com, "*Help*," http://www.hotrecorder.com/music_help.asp, downloaded on Sep. 26, 2008, 3 pages.
HotRecorder.com, "*FAQs*," http://www.hotrecorder.com/music_support.asp, downloaded on Sep. 26, 2008, 1 page.
WikiPedia—The Free Encyclopedia, "*Skype*," http://en.wikipedia.org/wiki/Skype, Downloaded on Sep. 26, 2008, 7 pages.
WikiPedia—The Free Encyclopedia, "*Skype Protocol*," http://en.wikipedia.org/wiki/Skype, Downloaded on Sep. 26, 2008, 4 pages.
Jabber.org, "*Main page*," http://www.jabber.org/web/main_page, Sep. 2, 2008, downloaded on Sep. 26, 2008, 1 page.
Jabber.org, "*FAQ*," http://www.jabber.org/web/faq, Sep. 4, 2008, downloaded on Sep. 26, 2008, 2 pages.
Apple Inc., "*iPhone: About Visual Voicemail*," http://www.support.apple.com/kb/HT 1486, Downloaded on Sep. 26, 2008, 3 pages.
Jabber.org, "*Products // Jabber XCP // Benefits*," http://www.jabber.com/CE/JabberXCPBenefits, downloaded on Sep. 26, 2008, 1 page.
Jabber.org, "*Products // Jabber Clients*," http://www.jabber.com/CE/JabberClients, downloaded on Sep. 26, 2008, 1 page.
Jabber.org, "*Products // JabberNow*" http://www.jabber.com/CE/JabberNow, downloaded on Sep. 26, 2008, 1 page.
KillerStartups.com, "*Kadoink.com—Mobilizing your Socializing*," http://www.killerstartups.com/Web20/kadoink-com-moblizing-your-socializiang, Downloaded on Sep. 26, 2008, 3 pages.
CNETNews.com, "*Kadoink's phonecast lines officially open for texting*," http://news.cnet.com/8301-17939_109-9829877-2.html, downloaded on Sep. 26, 2008, 1 page.
BusinessWire.com, "*LignUp 4.0 Delivers Industry's Most Comprehensive Suite of Communications Web Services*," Apr. 30, 2007, http://www.businesswire.com/portal/site/google/?ndmViewId=news_view&newsId=20070430005498&newsLang=en, Downloaded on Sep. 26, 2008, 6 pages.
VOIP-News.com, "*Company Profile—LignUp*," http://www.voip-news.com/vendors/lignup/, Downloaded on Oct. 3, 2008, 6 pages.
JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.
WikiPedia—The Free Encyclopedia, "*Push to Talk*" http://en.wikipedia.org/wiki/Push_to_talk, Downloaded on Sep. 26, 2008, 3 pages.
WikiPedia—The Free Encyclopedia, "*Slingbox*" http://en.wikipedia.org/wiki/Slingbox, Downloaded on Sep. 26, 2008, 4 pages.
About.com, "*Linux / Unix Command: talk*," http://linux.about.com/od/commands/l/blcmd11_talk.htm, Downloaded on Sep. 26, 2008, 2 pages.
Fall, Kevin, "*A Delay-Tolerant Network Architecture for Challenged Internets*," Feb. 2003, http://www.dtnrg.org/docs/papers/IRB-TR-03-003.pdf, 15 pages.
Chuah et al., "*Store-and-Forward Performance in a DTN*," Vehicular Technology Conference, 2006. VTC 2006-Spring. IEEE 63rd, Publication Date: May 7-10, 2006, vol. 1, on pp. 187-191.
Krishnan, et al., "*The SPINDLE Disruption-Tolerant Networking System*," Military Communications Conference, 2007. MILCOM 2007. IEEE Volume , Issue , Oct. 29-31, 2007 pp. 1-7.
WikiPedia—The Free Encyclopedia, "*Visual Voicemail*" http://en.wikipedia.org/wiki/Visual_voicemail, downloaded on Sep. 26, 2008, 1 page.
Amir et al., "*An Overlay Architecture for High Quality VoIP Streams,*", IEEE Transactions on Multimedia, Publication Date: Dec. 2006, vol. 8, Issue:6, on pp. 1250-1262.
Rothermel et al., "*An Adaptive Stream Synchronization Protocol*," Lecture Notes in Computer Science; vol. 1018, Proceedings of the 5th International Workshop on Network and Operating System Support for Digital Audio and Video, pp. 178-189, Year of Publication: 1995.".
Baset et al., "*An Analysis of the Skype Peer-to-Peer Internet Telephony Protocol*," INFOCOM 2006. 25th IEEE International Conference on Computer Communications. Proceedings (2006), pp. 1-11.
Cerf et al., "*A Protocol for Packet Network Intercommunication*," Communications, IEEE Transactions on, vol. 22, Issue 5, May 1974 pp. 637-648.
WikiPedia—The Free Encyclopedia, "*Eudora (email client)*," http://en.wikipedia.org/wiki/Eudora_(e-mail_client), Downloaded on Aug. 20, 2009, 3 pages.
"*Eudora*," Answers.com, http://www.answers.com/topic/eudora-e-mail-client, Downloaded on Aug. 20, 2009, 4 pages.
"*The Eudora Open Messaging Advantage*," Qualcomm, 1997, Part No. 100-50030-1, 23 pages.
"*Aspera—Next Generation File Transport—Broadcasting & Entertainment Media*," Asperasoft.com, http://www.asperasoft.com/en/industries/digital_media_10/Broadcast_Entertainment_Media_5, Downloaded on Sep. 22, 2009, 2 pages.
"*Aspera—Next Generation File Transport—fasp™ transfer times*," Asperasoft.com, http://www.asperasoft.com/en/technology/fasp_transfer_times_14/fasp_transfer_times_14, Downloaded on Sep. 22, 2009, 1 page.
"*Aspera—Next Generation File Transport—the fasp solution*," Asperasoft.com, http://www.asperasoft.com/en/technology/fasp_solution_3/the_fasp_solution_3, Downloaded on Sep. 22, 2009, 3 pages.
"*Aspera—Next Generation File Transport—the shortcomings of TCP file transfer*," Asperasoft.com, http://www.asperasoft.com/en/technology/shortcomings_of_TCP_2/the_shortcomings_of_TCP_file_transfer_2, Downloaded on Sep. 22, 2009, 2 pages.
"*Aspera—Next Generation File Transport—fasp technology overview*" Asperasoft.com, http://www.asperasoft.com/en/technology/fasp_overview_1/fasp_technology_overview_1, Downloaded on Sep. 22, 2009, 2 pages.
"*Aspera fasp™ High Speed Transport—A Critical Technology Comparison*," White Paper, Asperasoft.com, http://www.asperasoft.com/en/technology/white_papers_13/aspera_fasp_high_speed_transport_13, Downloaded on Sep. 22, 2009, 11 pages.
"*Palringo Brings First Push-to-Talk Application to the iPhone*," RedOrbit.com, http://www.redorbit.com/news/technology/1525545/palringo_brings_first_pushtotalk_application_to_the_iphone/index.html, Downloaded on Aug. 13, 2009, 2 pages.
*Palringo—Features*, Palringo.com, http://www.palringo.com/en/gb/features/, Downloaded on Aug. 13, 2009, 1 page.
Moren, Dan, "*Palringo Brings Picture Messaging to Iphone*," http://www.pcworld.com/article/149108/palringo_brings_picture_messaging_to_iphone.html, Downloaded on Aug. 13, 2009, 3 pages.
Paul, Ryan, "*Gmail gets Google Talk integration*," Arstechnica.com, http://arstechnica.com/old/content/2006/02/6128.ars , Downloaded on Aug. 20, 2009, 1 page.
Sherman, Chris, "*Google Integrates Chat with Gmail*," Search Engine Watch, http://searchenginewatch.com/3583121, Feb. 7, 2006, Downloaded on Aug. 20, 2009, 2 pages.
"*About Gmail*," http://mail.google.com/mail/help/chat.html, Downloaded on Aug. 20, 2009, 3 pages.
WikiPedia—The Free Encyclopedia, "*Google Talk*," http://en.wikipedia.org/wiki/Google_Talk, Downloaded on Aug. 20, 2009, 8 pages.
Azuri, Calvin, "*Palringo Gold Launched on BlackBerry Smartphone*", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.
Liaw, Kim Poh, "*Palringo launches its IM Software for Android Phones*," Slashphone.com, Mar. 24, 2009, http://www.slashphone.com/palringo-launches-its-im-software-for-android-phones-245111, Downloaded on Aug. 13, 2009, 8 pages.
WikiPedia—The Free Encyclopedia, "*Palringo*" http://en.wikipedia.org/wiki/Palringo, Downloaded on Aug. 13, 2009, 1 page.

\* cited by examiner

COMMUNICATION APPLICATION FOR CONDUCTING CONVERSATIONS INCLUDING MULTIPLE MEDIA TYPES IN EITHER A REAL-TIME MODE OR A TIME-SHIFTED MODE

CROSS-REFERENCE TO RELATED APPLICATIONS

This application is a continuation of prior, co-pending U.S. application Ser. No. 13/651,339 filed Oct. 12, 2012, which was a continuation of U.S. application Ser. No. 12/552,985 (now U.S. Pat. No. 8,321,582), filed on Sep. 2, 2009, which claims the benefit of priority to U.S. Provisional Patent Application No. 61/157,108 filed Mar. 3, 2009, entitled "Novel Modes of Communication" and U.S. Provisional Patent Application 61/228,203 filed Jul. 24, 2009 and entitled "Communication Platform for Conducting Conversations Including Multiple Media Types in Either a Real-time mode or a Time-Shifted Mode." U.S. application Ser. No. 12/552,985 is also a Continuation-in-Part of U.S. application Ser. No. 12/028,400 (now U.S. Pat. No. 8,180,029), filed Feb. 8, 2008, and Ser. No. 12/192,890 (now U.S. Pat. No. 8,090,867), filed Aug. 15, 2008, both entitled "Telecommunication and Multimedia Management Method and Apparatus." Each of the above-listed provisional and non-provisional applications are incorporated herein by reference in their entirety for all purposes.

BACKGROUND

1. Field of the Invention

This invention relates to communications, and more particularly, to a communication application for conducting conversations and that supports (i) one or more media types such as live voice and text, (ii) the ability to conduct the conversation in either a real-time synchronous mode, similar to a "live" conversation, or an asynchronous time-shifting mode and (iii) the ability to seamlessly transition between the two modes.

2. Description of Related Art

In spite of being a mature technology, telephony has changed little over the years. Similar to the initial telephone system developed over a hundred years ago, a telephone call today still requires a circuit connection between the parties before voice can be transmitted. If a circuit connection is not established, for whatever reason, no communication can take place.

A known advancement in telephony is voice mail. If a call is made and the recipient does not answer the phone, then the call is "rolled-over" into a separate voice mail system, typically maintained on a voice mail server or answering machine connected to a phone. The telephone and voice mail systems, however, are not integrated. Rather, the voice mail services are "tacked-on" to the underlying phone system. The fact that the two systems are separate and distinct, and not integrated, creates a number of inconveniences and inefficiencies.

Consider a real-world situation where two parties wish to have a brief conversation. If party A makes a call while party B is busy, then after the phone rings numerous times, party A is eventually rolled over into the voice mail of party B. Only after listening to and navigating through the voice mail system, can party A leave a message. To retrieve the message, party B is required to call into the voice mail system, possibly listen to other messages first in the queue, before listening to the message left by party A. In reply, party B may call party A. If party A is busy, the above process is repeated. This routine may occur multiple times as the two parties attempt to reach each other. Eventually one of the parties will place a call and a live circuit will be established. Only at this point is it possible for the two parties to "rendezvous" and engage in a live conversation. The difficulty and time wasted for the two parties to communicate through voice mail, as highlighted in this real-world example, is attributable to the fact that the telephone system and voice mail are two different systems that do not interoperate very well together.

With the advent of the Internet, telephony based on Voice over Internet Protocol or VoIP has become popular. Despite a number of years of development, VoIP services today are little different than traditional telephony, as described above. Add on services like voicemail, email notifications and phonebook auto-dialing, are all common with VoIP. The fundamental communication service of VoIP, however, remains the same. A party is still required to place a call and wait for a connection to be made. If the recipient does not answer, the call is rolled over into voice mail, just like conventional telephony. VoIP has therefore not changed the fundamental way people communicate.

Besides VoIP, other forms of communication have become popular over the Internet. Email, instant messaging, texting, video chats have all become widely used. Each form of communication, however, is a different application that relies on a separate communication platform, each defining a distinct protocol for conveying media from a sender to a recipient. Each protocol is generally designed to carry only one specific type of media and is generally not compatible with the other protocols. For example, the email protocol or SMTP cannot be used to transport live voice, telephones cannot be used to transport emails, chat protocols cannot be used to transport text or emails, etc. Due to the constraints described above, the natural tendency is for a person receiving a message of one media type to reply using the same media type. If a person receives an email, text message, or voice message, the reply is likely to be an email, text or voice message respectively. As a result, the messages of a conversation tend to all be of the same media type and use the same protocol.

It is always possible for a person receiving a message of one media type using a first protocol to respond with a message of another media type using a second protocol. For example, a person receiving an email may respond by picking up the phone and calling the sender of the email. When this occurs, different communication applications are being used. There is no convergence of the different media types over a single communication protocol. As a result, the messages of the conversation are broken up or fragmented across different communication platforms. There is currently no way to interleave the messages of different media types and transported using different platforms and/or protocols into a unified conversation record.

Attempts have been made to unify communications across the different communication platforms, such as voice mail, email, instant messaging, chat messaging, as well as presence information, call controls, etc. These attempts typically involve the creation of a user interface layer, which sits above that various underlying communication application platforms, which present to the user a unified user interface. Unified communications allow an individual to receive a message in one media type and to respond with a message in another media type. For example, one may receive a voice mail, but may elect to respond immediately, through a chat message or phone call.

With unified communications, however, the "unification" occurs at the user interface layer, not at the underlying protocol or core layer of the various communication platforms. If a person receives an email and elects to respond by a chat message, then the incoming message is transported over the SMTP (or a similar email protocol) and the outgoing message is transported over the chat protocol. The outgoing chat message is not somehow transported over the email protocol. Consequently there is no convergence of the different media types being transmitted over the same communication core. As result, there is no way to construct conversations of interleaved messages of different media types in a coherent manner using current unified communication efforts.

Another shortcoming of the above listed communication applications is that they are each either synchronous or asynchronous, but not both. Text, SMTP or other email protocols are asynchronous, while telephone, video chat and instant messaging are synchronous. The asynchronous protocols cannot be used for live communication, whereas the synchronous protocols cannot be used for asynchronous communication.

SUMMARY OF THE INVENTION

A communication application configured to support a conversation among participants over a communication network. The communication application is configured to (i) support one or more media types within the context of the conversation, (ii) interleave the one or more media types in a time-indexed order within the context of the conversation, (iii) enable the participants to render the conversation including the interleaved one or more media types in either a real-time rendering mode or time-shifted rendering mode, and (iv) seamlessly transition the conversation between the two modes so that the conversation may take place substantially live when in the real-time rendering mode or asynchronously when in the time-shifted rendering mode.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The term "media" as used herein is intended to broadly mean virtually any type of media, such as but not limited to, voice, video, text, still pictures, sensor data, GPS data, or just about any other type of media, data or information.

As used herein, the term "conversation" is also broadly construed. In one embodiment, a conversation is intended to mean a thread of messages, strung together by some common attribute, such as a subject matter or topic, by name, by participants, by a user group, or some other defined criteria. In another embodiment, the messages of a conversation do not necessarily have to be tied together by some common attribute. Rather one or more messages may be arbitrarily assembled into a conversation. Thus a conversation is intended to mean two or more messages, regardless if they are tied together by a common attribute or not.

A. System Architecture

Figure 1:
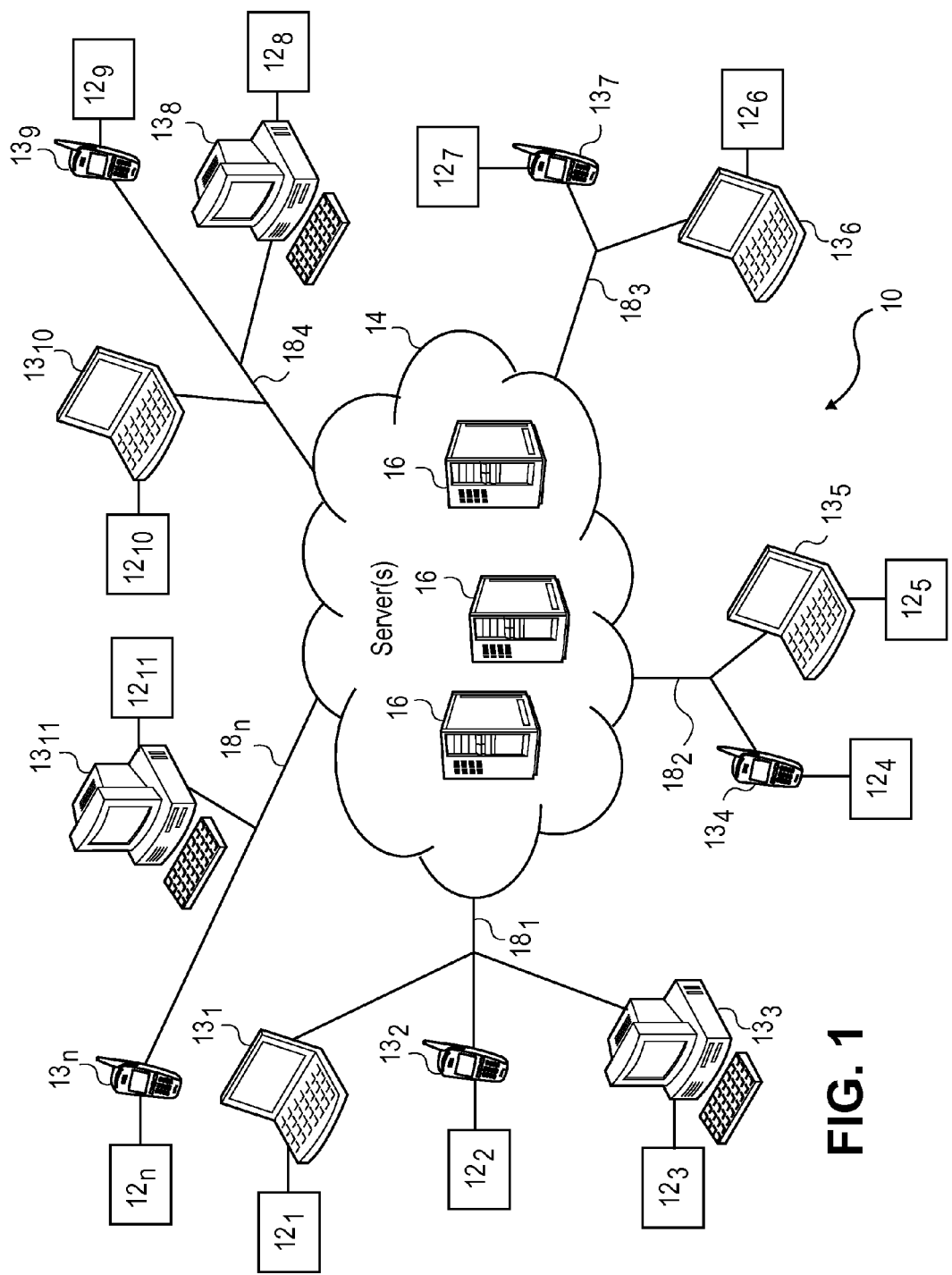
FIG. 1 is a block diagram of the telecommunication and media management system according to the invention.

Referring to FIG. 1, a block diagram of the telecommunication and media management system according to one embodiment of the invention is shown. The system 10 includes a plurality of clients $12_1$ through $12_n$, running on devices $13_1$ through $13_n$ respectively. The devices 13 communicate with one another over a communication services network 14, including one or more servers 16. One or more networks $18_1$ through $18_n$, is provided to couple the plurality of devices $13_1$ through $13_n$ to the communication services network 14. In various embodiments, the networks 18 may be the Public Switched Telephone Network (PSTN), a cellular network based on CDMA or GSM for example, the Internet, a tactical radio network, or any other communication network, or a combination thereof. The communication services network 14 is a network layer on top of or otherwise in communication with the various underlying networks $18_1$ through $18_n$. In various embodiments, the network layer 14 is either heterogeneous or homogeneous. Clients $12_1$ through $12_n$ communicate with one another and with servers 16 over the networks $18_1$ through $18_n$ and network 14 using individual message units, referred to herein as "Vox packets", which are described in detail below.

B. Client Architecture

Figure 2:
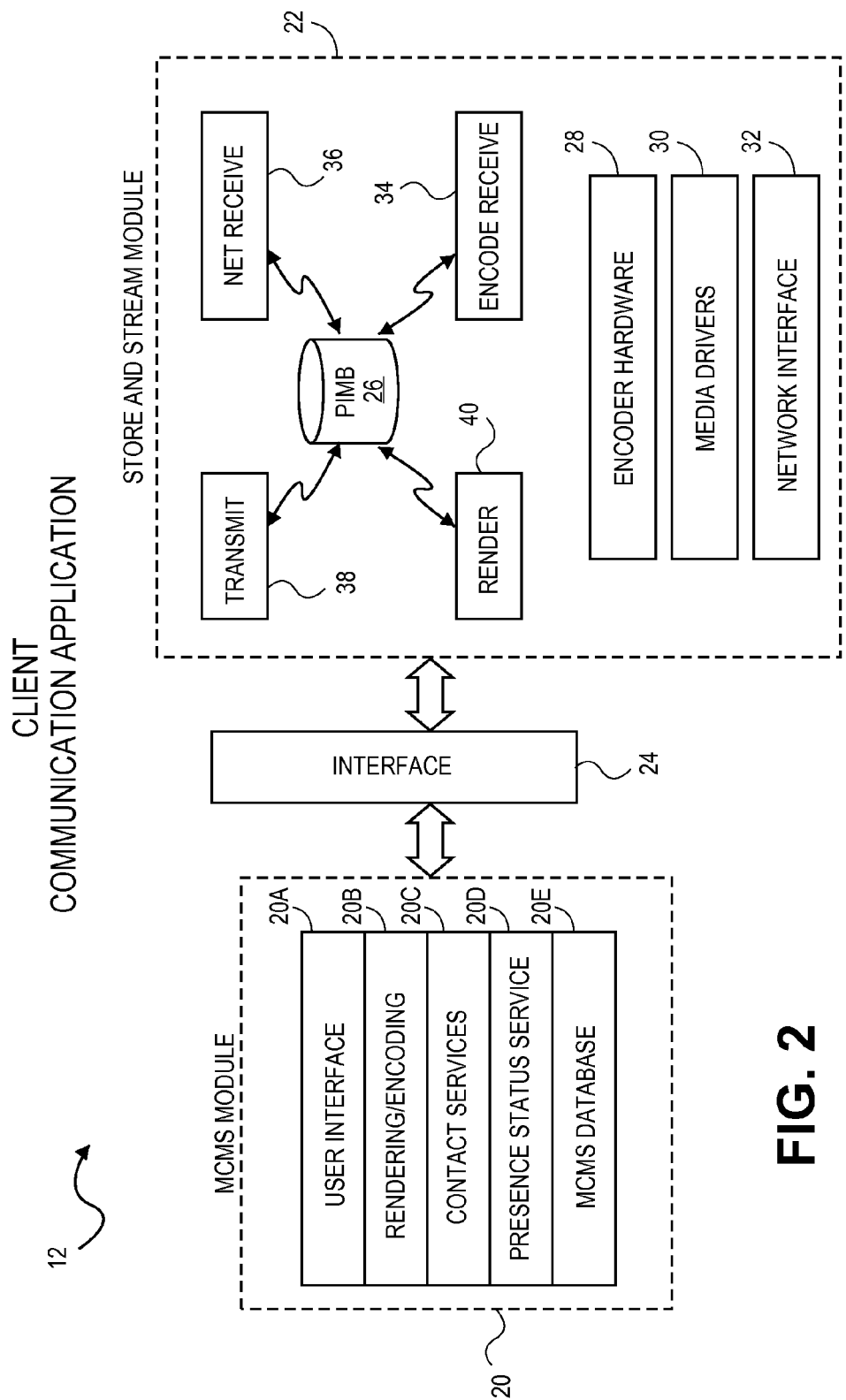
FIG. 2 is a diagram of a communication application running on client devices in the telecommunication and media management system according to the invention.

Referring to FIG. 2, a block diagram of the client 12, which is designed to run and be embedded in the communication devices 13. The client 12 is a communication application that includes a Multiple Conversation Management System (MCMS) module 20, a Store and Stream module 22, and an interface 24 provided between the two modules. The key features and elements of the communication application of client 12 are briefly described below. For a more detailed explanation, see U.S. application Ser. Nos. 12/028,400, 12/253,833, 12/253,820 and 12/253,833, all incorporated by reference herein for all purposes.

The MCMS module includes 20 a number of modules and services for creating, managing and conducting multiple conversations. The MCMS module 20 includes a user interface module 20A for supporting the audio and video functions on the client device 12, rendering/encoding module 20B for performing rendering and encoding tasks, a contacts service 20C for managing and maintaining information needed for creating and maintaining contact lists (e.g., telephone numbers and/or email addresses), a presence status service 20D for sharing the online status of the user of the client device 12 and indicates the online status of the other users and the MCMS data base 20E, which stores and manages the meta data for conversations conducted using the client device 12.

The Store and Stream module 22 includes a Permanent Infinite Memory Buffer or PIMB 26 for storing in a time-indexed format the media of received and sent messages. Encoder hardware 28 is provided for encoding the media, such as voice, text, video or sensor data, generated using the client device 12. Media drivers/encoders 30 are provided for driving the media generating components, such as speaker and/or a display (not illustrated) and encoders for encoding media generated by a microphone, camera, keyboard, touch-sensitive display, etc. (also not illustrated) on client 12. A network interface is provided 32 for connecting the client device 12 to the network 14, either through a wireless or wired connection.

The store and stream module 22 also includes modules for performing a number of functions including encode receive 34, net receive 36, transmit 38 and render 40. The encode receive function 34 involves the receiving, encoding, time-indexing and storing in the PIMB 26 media created using the client 12 in a time-indexed format. The net receive 36 function involves the time-indexing and storing in the PIMB 26 the media contained in messages received from others over the network 14 in the time-indexed format. The transmit function 38 is responsible for transmitting the media of messages created on the client 12 to other recipients over the network 14. The render module 40 enables the client 12 to render the media of messages in either the near real-time mode or the media stored in the PIMB 26 in the time-shifted mode. The modules 34 through 40 enable the Store and Stream module 22 to (i) progressively and simultaneously transmitting media over the network 14 as it is being created using a client 12 enabled device 13 and (ii) rendering media on the client 12 enabled device 13 either as it is being received over the network 14 in a real-time mode or from the PIMB 26 in a time-shifted mode.

With the Store and Stream module 22, Message transmission is essentially "full-duplex", enabling any party to send a Message at any time, even while another party is also sending a Message, or if the other party is unavailable or otherwise engaged. The Store and Stream module is able to render messages as in a live PSTN or VoIP call or deliver them for time shifted messaging modes. It is able to optimize transmission and control Rendering according to the desires of the User.

The Store and Stream module 22 maintains connectivity with all target recipients (e.g., Servers 16 or other Devices 13) on the underlying network 18, manages all message, signal, and media transmissions, and optimizes the delivery speed and bandwidth usage across the network 18 to meet a User's immediate performance requirements, while managing network quality and capacity. The module 22 adapts and optimizes Media delivery commensurate with the quality and capacity of the underlying network 18. When insufficient underlying network resources are available, the quality of the transmitted Media streams can be degraded. As bandwidth becomes available, the quality of the transmitted Media streams may be increased. In addition to tradeoffs of Media quality, the Store and Stream functionality can make tradeoffs in the amount of Media transmitted in each packet based on Users' intentions to render data in real time as described below.

By dynamically controlling the delivery rate of Media based on the conditions of the underlying network 18, the Store and Stream module 22 is optimized to deliver time-sensitive Media that is "good enough" to Render upon receipt, and the guarantee eventual delivery of exact or full copies of the Media for archival purposes through a background process of requesting retransmission of missing, low quality, or damaged packets. As long as sufficient network resources exist to meet minimum Media quality levels, this retransmission does not impede the Rendering of live call Media. The Clients 12 of the system 10 are thus designed to bridge the performance gap between the delivery of an exact or complete copy of the Media at the expense of substantial potential latency versus the quick delivery of Media, but with no guarantees of completeness. In the context of this application, the term "good enough" means that the quality of the Media is sufficient so that when it is rendered, it is intelligible. The notion of "good enough" is therefore subjective and should not be construed in absolute terms. For example, the quality level of certain Media to be good enough may vary depending on the type of Media, circumstances, and other factors.

The Store and Stream module 22 further persistently stores all Media created by or otherwise originating using a Device 13 or received over the network 18 from other Device 13 and/or users. There are several significant advantages of storing this Media on the Device 13 running the Client 12: (i) it enables Users to leave a Message for another party, even when the sender and/or the recipient has either unavailable or poor network connectivity. In the case of insufficient bandwidth, the Message will be transmitted as fast as available bandwidth can be effectively used. In the case of no connectivity, the Message is queued for transmission as soon as network connectivity becomes available, resulting in a time-shifted delivery; (ii) the User has the ability to pause, replay, fast-forward, and Catch-Up-To-Live with an ongoing Conversation, as well as retrieve and review the archived Messages of previous Conversations; and (iii) it enables the optimization of data payloads over the system 10 and improves system resilience against network bandwidth and connectivity problems that may occur from time to time.

C. The Vox Protocol And Indexed Media Payloads

As noted above, the Vox protocol is used by the Store and Stream module 22 to support all facets of payload transmission, storage, and optimization. The Vox packet is a structured message format designed for encapsulation inside a transport packet or transport packets of the underlying technology of the network 18. This arrangement significantly improves the flexibility of the system 10. By embedding the Vox packets into existing transport packets, as opposed to defining a new transport layer for "Voxing" applications, the system 10 takes advantage of current packet based communication networks running over the existing telecommunications infrastructure. A new network infrastructure for handling the Vox packets therefore need not be created to take advantage of all the benefits of the system and method described herein.

Figure 3A:
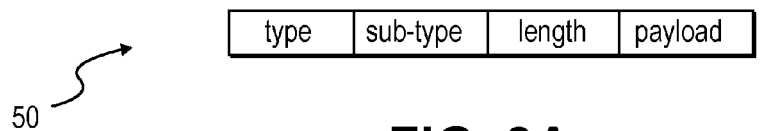
FIGS. 3A through 3D illustrate various embodiments of data payloads used in the communication and management system of the invention.

Referring to FIG. 3A, the general format structure of a Vox packet 50 is illustrated. The format of the Vox packet 50 includes fields for type, sub-type, length, and payload. The type field designates different types of Vox packets, including authentication, signaling, media payload, media multiplex (one message), and media multiplex (multiple messages). The "sub-type" field designates different message types, including authentication, signaling or media type messages. Possible sub-types for authentication messages include those necessary for key exchanges and authentication. Possible sub-types for signaling messages include registration, routing, message set-up, and network management. Possible sub-types for media messages include different Codec styles and different payload aggregation techniques. The length field defines the overall length or size of the payload. The payload field contains the actual payload or media of the packet 50. A payload may carry the one type or multiple types of media (e.g., voice, text, video, etc.)

Figure 3B:
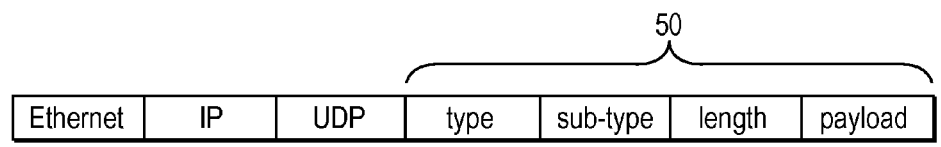

Referring to FIG. 3B, a diagram illustrating a Vox packet 50 encapsulated in an exemplary protocol used by the network 18 is shown. In this example, the Vox packet 50 is embedded in underlying UDP, IP and Ethernet transport packets 52 respectively. In this manner, the Vox packet 50 can be transported across underlying UDP, IP and Ethernet layers of the network 18. Standard protocol encapsulation technique used by packet networks may be used to encapsulate the Vox packet 50 into the underlying UDP, IP and Ethernet transport packets 52 respectively.

Figure 3C:
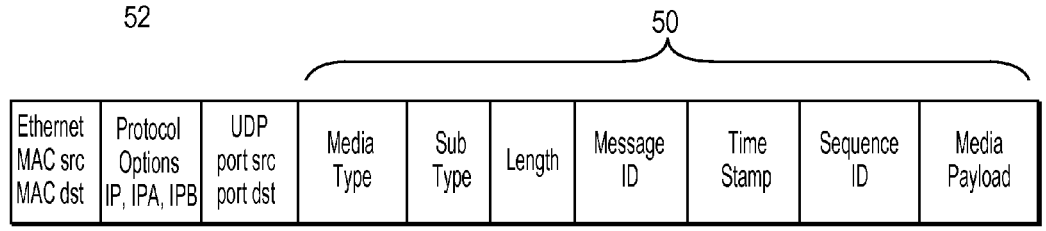

Referring to FIG. 3C, a diagram illustrating a media multiplex Vox packet 50 encapsulated in UDP, IP, and Ethernet 54 is illustrated. In this example, the Vox packet 50 includes a Media type field, a Media sub-type field, a Length field, a Message ID field, a Time stamp field, a Sequence ID field, and a Media payload field.

Figure 3D:
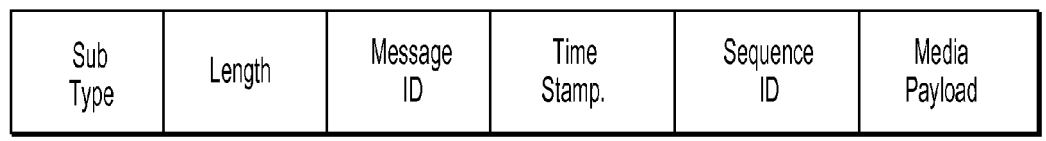

Referring to FIG. 3D, the format of an indexed media payload 58 is illustrated. The indexed media payload includes a Sub-type field, a Length field, a Message identifier (ID) field, a Time-stamp field, a Sequence identifier (ID) field, and Field for the media payload.

The encapsulation of Vox packets 50 into the transport packets of the underlying network allows the media, messages and conversations to each be defined by a number of attributes.

When created or otherwise originated on a device 13, media is progressively segmented and placed into the payloads of a plurality of Vox packets 50 as the media is being created. The packets are then progressively stored in the PIMB 26 and progressively transmitted (i.e., streamed) by transmit module 38 on the transmitting client 12 enabled device 13 simultaneously as the media is being created. On the receive side, the receiving client 12 enabled device 13 receives the streamed media and progressively stores the media in the PIMB 26 of the receiving device 13 as it is received. If the receiving device 13 is in the synchronous or real-time mode, the render function 40 also progressively renders the streaming media simultaneously as it is being received. Alternatively, the render function 40 may retrieve the received media from the PIMB 26 at an arbitrary later time, defined by the user of the receiving device 13, when reviewing the media in the time-shifted mode.

Since each packet 50 is indexed, time-stamped, and given a sequence identifier, the individual packets can be assembled into messages. Conversations are constructed by sequentially threading individual messages, each assembled from the media payload of one or more packets 50. As noted above, the messages of a conversation may be assembled using a defined attribute or in some other arbitrary way. Regardless of how the messages are assembled, a conversation may include messages of different types of media.

The abilities to (i) progressively and persistently store and transmit media as it is being created on the transmitting device 13 and (ii) progressively store and render the media on the receiving devices allows the participants of a conversation to converse in real-time. The persistent storage of the media in the PIMB 30 allows the participants of a conversation to participate in the time-shifted mode. A host of rendering options provided on the client 12 enabled devices 13 also allows the participants to seamlessly transition the conversation back and forth between the two modes.

One further unique aspect of the system 10 is that the media payloads generated by a client 12 are stored in multiple locations. Not only are the payloads stored in the PIMB 26 of the generating device 13, but also in a PIMB (not illustrated) of the server(s) 16 on the communication services network 14 and the PIMB 26 of the receiving devices 13. This basic feature enables or makes possible much of the "Voxing" functionality described above and provides the system 10 with both resilience and operability, even when network conditions are poor or when a participant of a conversation is not connected to the network.

D. Interoperability With Underlying Telecommunication Protocols

The system 10 is intended to run or be layered over a variety of existing communication networks 18, such as the Internet, fixed PSTN type circuit networks, and mobile or cellular phone networks, or a combination thereof. The system 10 is designed around the concept of moving many small units of information (i.e., the Vox packets 50) between different Clients 12 and Servers 16 in the system 10. While the size of the Vox packets 50 may vary, depending on their function and payload, they all appear to be the same kind of data to the underlying network layer. In one embodiment, the system 10 has been designed and optimized for IPv4 networks such as the Internet, but other types of networks may be supported as well. For the purposes of this document, the term "IP" should be taken to mean IPv4, IPv6 or any other current or future implementation of the Internet Protocol.

Figure 4:
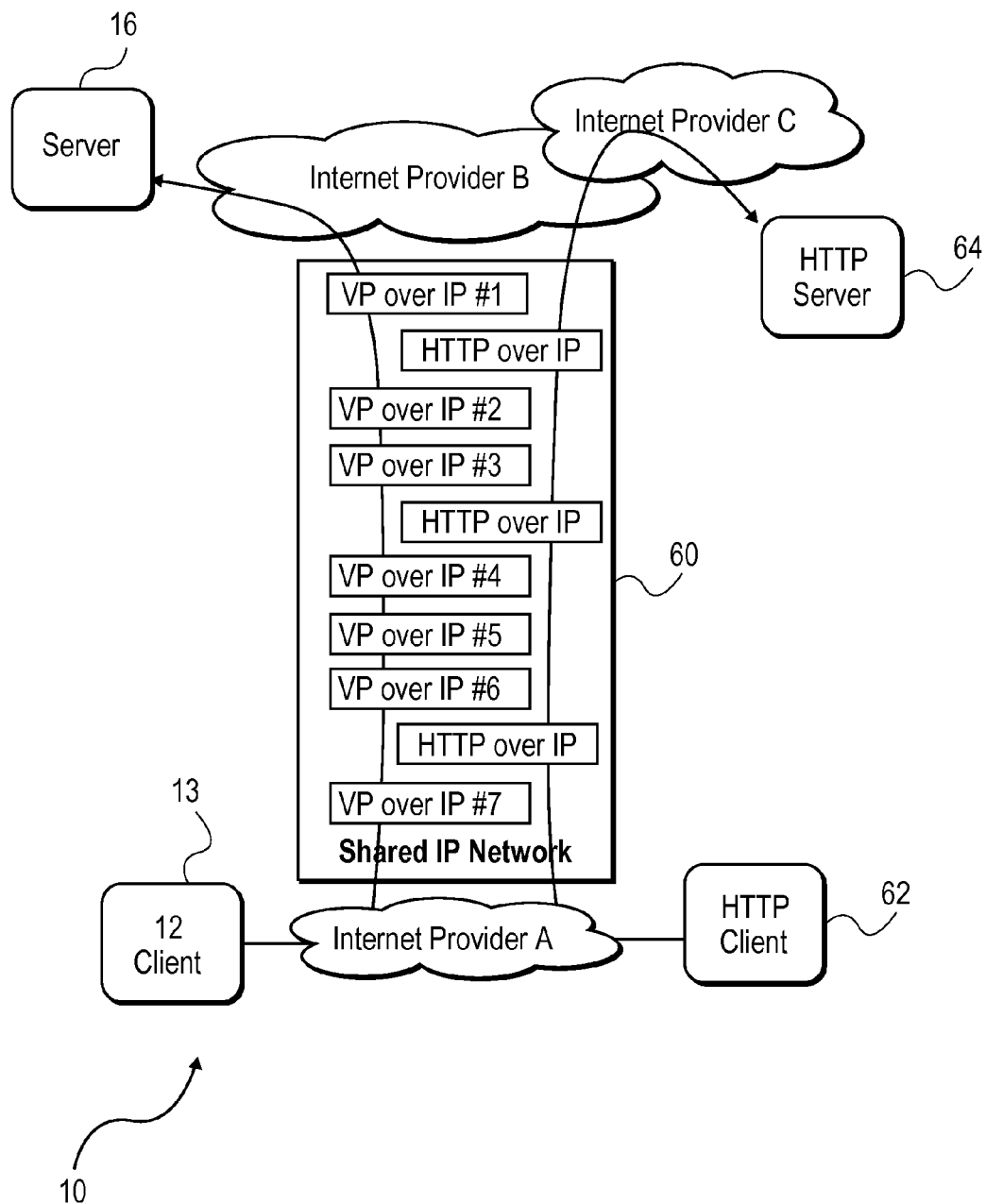
FIG. 4 is a diagram illustrating data being transmitted over a shared IP network in accordance with the invention.

Referring to FIG. 4, a diagram of a client 12 running on device 13 and communicating with a server 16 over a shared IP network 60 is shown. As illustrated, the client 12 is coupled to the shared IP network 60 through a first Internet service provider A and the server 16 is coupled to the shared IP network 60 by a second Internet service provider B. During communication, the Vox packets 50 (designed "VP" in the figure) are encapsulated within UDP/IP packets and then interleaved among other IP protocol packets as is well known in the art and transmitted across the shared IP network 60 from the client 12 to server 16, or vice versa. As is well known, each lower packet layer encapsulates the entire packet of the layer immediately above it. Packets can also be sent in a similar manner between two servers 16. In this manner, messages are routed between client 12 enabled devices 13, including any intermediate server 16 hops, over the shared IP network 100. At each hop, the Vox packets 50 are embedded in the underlying IP protocol and transmitted, until they reach the target destination.

The diagram of FIG. 4 is merely exemplary, showing only a single client 12 and server 16 connected to the network 60 for the sake of illustration. In actual embodiments of the system 10, a large number of clients 12 and one or more servers 16 are typically connected to the shared IP network 60. It is also useful to note that the client 12 and server 16 do not have exclusive use of the IP network 60. By way of example, an HTTP client 62, which is coupled to the network 60 through Internet provider A, can send packets back and forth with an HTTP server 64, coupled to the network 60 through a third Internet provider C. The system 10 does not control the manner in which the VPs embedded in the IP packets traverse the network 60. Rather, all packets that traverse and share the network 60 do so in accordance with the standard procedures of the underlying shared IP network 60.

Figure 5:
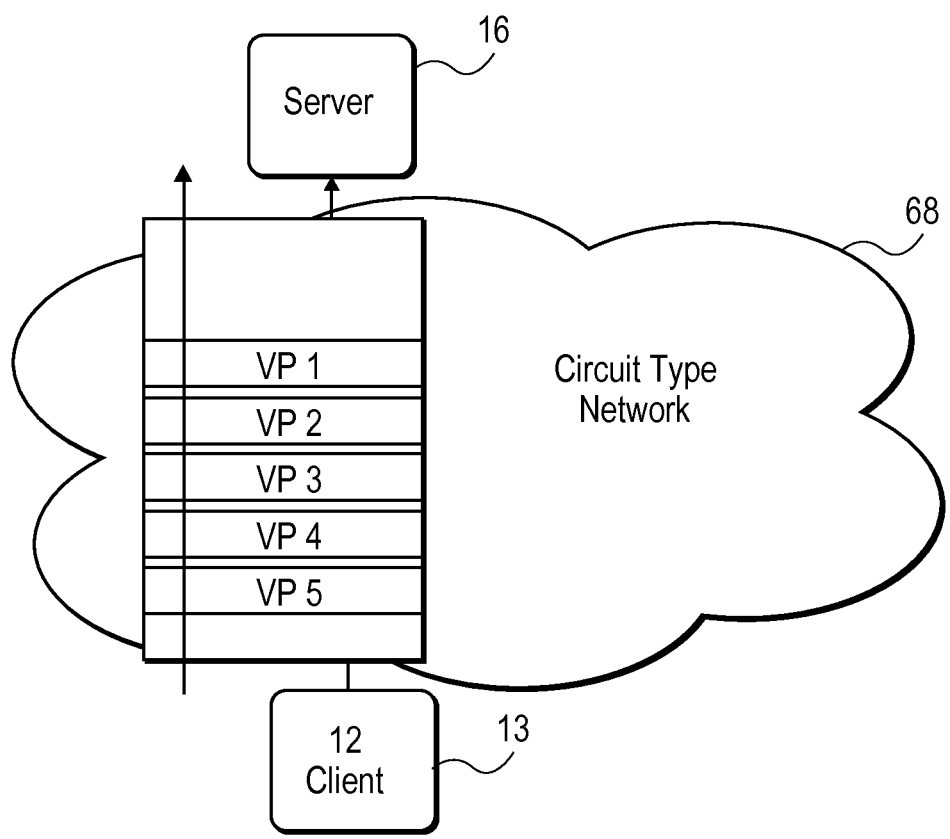
FIG. 5 is a diagram illustrating data being transmitted over a circuit-based network in accordance with the invention.

Referring to FIG. 5, a "circuit" based network 68 such as a GSM mobile phone network is illustrated. The circuit network 68 is coupled between client 12 running on device 13 and server 16. Once a circuit is established between the client 12 and server 16, the system 10 layers the Vox packets 50 (e.g., VP1, VP2, VP3, VP4, VP5, etc.) onto the underlying packets used by the network 68. The underlying packets, with the embedded Vox packets 50, are then transmitted across the network 68, creating a "virtual Vox" circuit. The Vox packets 50 sequentially traverse the circuit network 68, typically with spacing or framing data as is well known in the art for transmitting data over a circuit network. In addition, packet construction parameters, such as the payload size and the number of header fields, may be used to exploit the lack of per-packet overhead and to increase speed and/or efficiency of data transfer across the network 68. It should be noted again that for the sake of simplicity, only a single client 12 and server 16 are shown connected to the network 68. It should be understood, however, that additional circuits between multiple clients 12 and/or servers 16 as well as other components may be established concurrently through the network 68. The network 68 is therefore not dedicated for the transmission of Vox packets 50, but rather may be shared with other types of network traffic.

Figure 6:
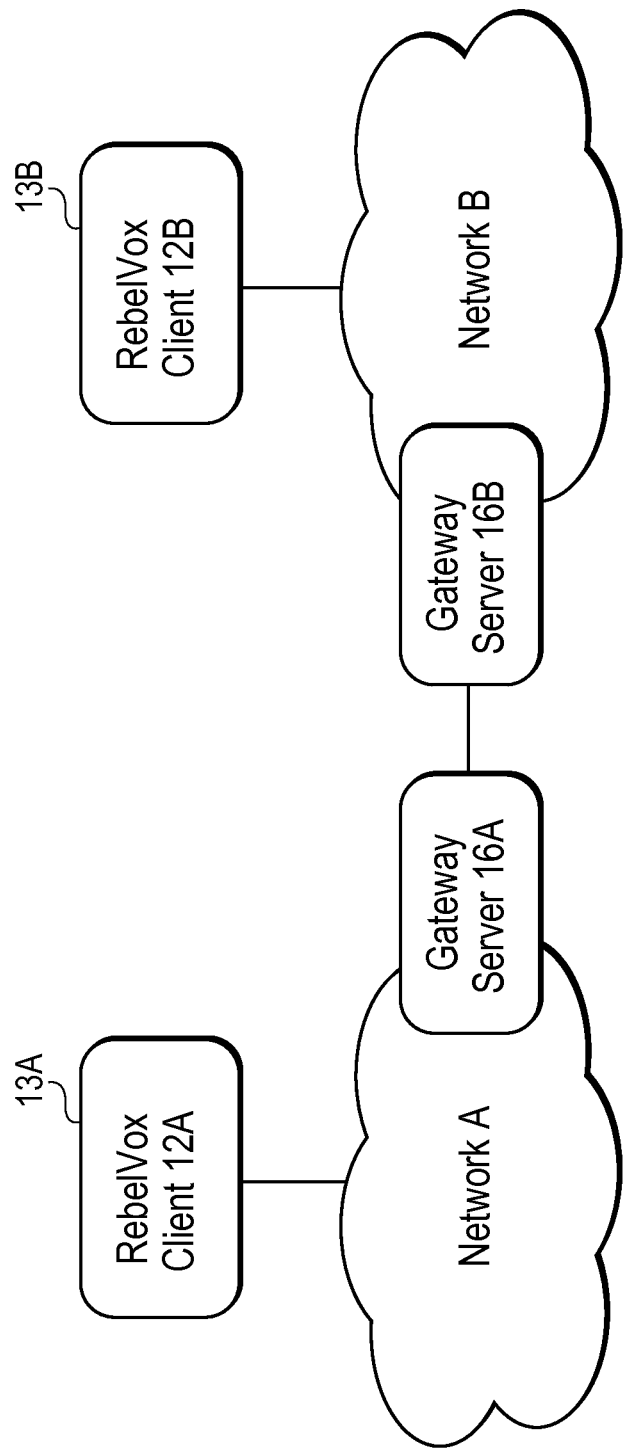
FIG. 6 is a diagram illustrating data being transmitted across both a cellular network and the Internet in accordance with the invention.

Referring to FIG. 6, a diagram illustrating communication between a first client 12A enabled device 13A associated with a first network A and a second client 12B enabled device 13B associated with a second network B is illustrated. The networks A and B further each include gateway servers 16A and 16B respectively. The gateway server pair 16A and 16B facilitate communication between the two networks A and B, allowing the devices 13A and 13B to communicate with each other. In various embodiments, the networks A and B could each be any type of network. For example, each network A and/or B could be an IP network, a circuit type network, or a wireless or cellular network (i.e., CDMA, GSM, TDMA, etc.). The servers 16 that straddle the two networks A and B are considered gateway servers because they route traffic or serve as a "gate" between the two networks. The gateway servers 16A and 16B are also responsible for translating media from one packet type used in the first network A and to a second media type used on the second network B and vice versa. For example, the gateway servers may convert IP packets used on a first IP network into packets defined by the SIP, RTP protocol as used on the second network or vice versa. With each translation, the Vox packet payload substantially remains the same, while the underlying packet used for transport is translated into the native packet used on the receiving network.

With the system 10, there are a several basic network interaction considerations to optimize system performance. These considerations include factors such as resolving the underlying address to which the Vox packets 50 are to be sent, the integrity of any sent Vox packets 50, and the management of the Maximum Transmission Unit (MTU) of a single message that may be sent across a given network or combination of networks.

The address of a target client 12 needs to be known so that the underlying network delivers the Vox packet 50 to the correct location. With IPv4 networks, the address is typically an IPv4 Address, which is a 32-bit number that uniquely identifies a host within the network. For other networking technologies, the address could be some other type of identifier. IP networks use the Domain Name System (DNS) to resolve human-readable names into IP addresses, and the Address Resolution Protocol (ARP) to resolve IP addresses into physical addresses. Regardless of the underlying networking technology, the system 10 uses one of the above-mentioned or other known addressing schemes for delivery of Vox packets 50 to the correct location.

As with almost any packet-based communication network, transmitted Vox packets 50 might not be delivered to the addressed location if the underlying network is unable to deliver the packets in which the Vox packets are encapsulated. Packet-based networks typically do not inform transmitters when packets are dropped. Instead, the burden of identifying and retransmitting dropped packets falls onto the transmitting and receiving devices. The system 10 is thus designed to use receiver receipt report messages to coordinate this packet loss management. If the underlying network is able to inform the sender of lost or dropped packets, the system 10 utilizes this information in its retransmission protocol. For more details on the Cooperative Transmission Protocol used for retransmission of missing and/or defective packets, see co-pending commonly assigned U.S. application Ser. Nos. 12/028,400 and 12/192,890, both incorporated by reference herein for all purposes.

The management of MTU is the determination of the Maximum Transmission Unit (i.e., the maximum size of a single message) that may be sent across a network. For packet-based networks, the underlying network imposes the MTU. For circuit-switched networks, the MTU may be a tunable parameter for network efficiency and performance. Thus in most cases, the underlying network imposes or determines the maximum size of the Vox packet 50 that may be transmitted efficiently. For example with IP networks, packets may be fragmented if the payload exceeds the MTU, but at a substantial performance penalty. With IP over Ethernet networks, the transmitting device has an MTU of 1518 bytes, as enforced by Ethernet. The largest IP packet must leave room for the Ethernet headers. The largest UDP packet must leave room for both IP and Ethernet headers and the largest Vox protocol that may be generated on Ethernet for example is the Ethernet MTU (1518)–IP header (20)–UDP header (8)=1490 bytes. Since Vox packets 50 have a header of its own, the actual Vox media payload will be less than 1490 bytes on an Ethernet network. For Gigabit Ethernet, the MTU could be much larger, but would be determined using a similar formula.

In a purely packet-based network, there are two potential values for MTU, the local link MTU and the path MTU. Determining the local link MTU yields the maximum size for the Vox packets 50 to be efficiently sent out to the local network interface. The path MTU yields the maximum size of the Vox packet 50 that may be sent intact all the way to the remote node. If a sender is connected via Ethernet, the Vox packet 50 might pass through various other systems, with smaller MTUs, en-route to the recipient. The smallest MTU on the path to the destination needs to be resolved and known by the sender. In the IP world, there is a standard procedure for discovering the smallest MTU, called "Path MTU Discovery", which may be used. For other kinds of networks, an equivalent procedure may be used. Again, since the system 10 is layered on top of other networks 18, any of the above MTU algorithms may be used.

E. Conversation Examples

As described above, the progressive nature of the of the client communication application 12 enables the users of devices 13 to communicate in the real-time mode, while the persistent storage of media allows users to communicate in the time-shifted mode. Furthermore, as each Vox packet 50 is indexed, time-stamped, and given a sequence identifier, the individual packets can be assembled into messages. As a result, conversations between participants, including different media types, such as voice, video, text, etc., can be constructed by sequentially threading individual messages together. Since each participant may create different media types during the conversation, the messages containing the various media types (e.g., voice and text) may be interleaved throughout the conversation history.

Referring to FIGS. 7A through 7K, a series of screen shots showing the user interfaces on two communication devices 13 are provided during the course of a conversation between participants named Sam Fairbanks and Jill Wright. In this example, the attribute that defines the conversation is the name of one of the participants (i.e., "Jill Wright"). As the various screen shots illustrate in this example, the types of media of the conversation are a combination of live voice in the real time mode and voice and/or text messaging in the time-shifted mode. In addition, the example illustrates how the conversation may seamlessly transition between the two modes.

Figure 7A:
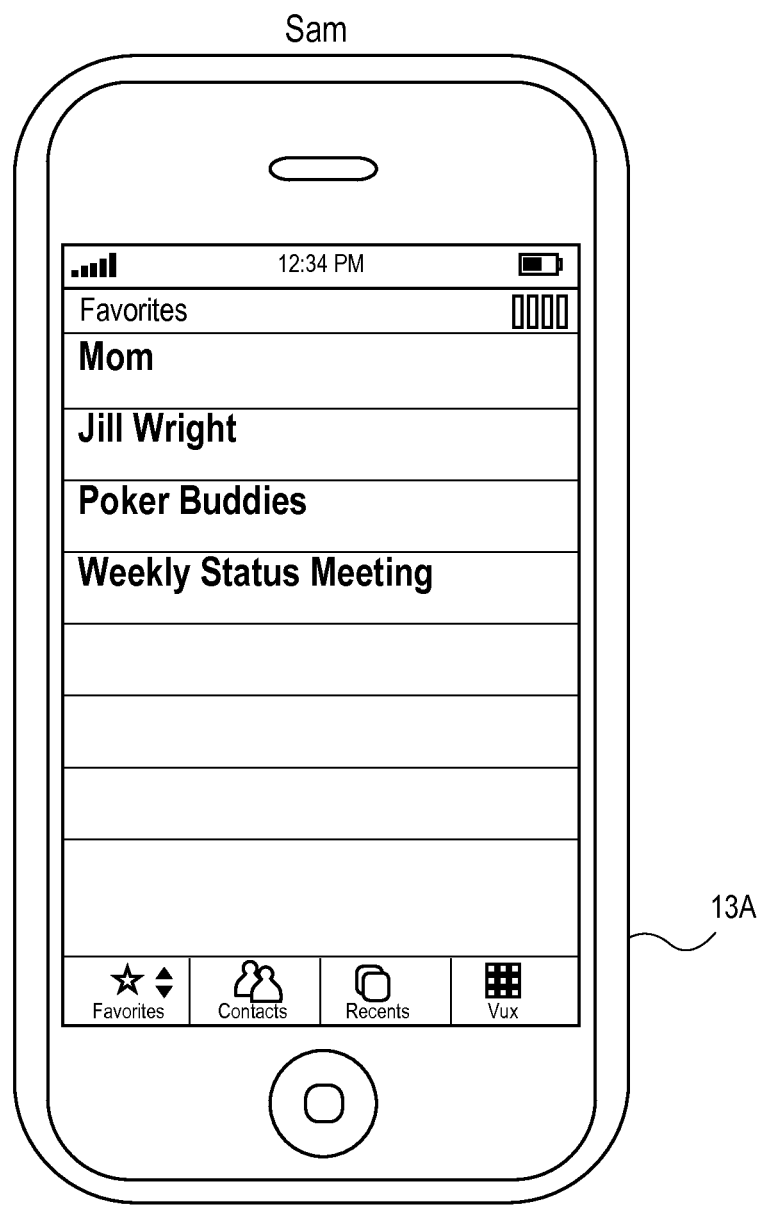
FIGS. 7A through 7K illustrate a series of user interfaces of two parties engaged in a conversation including different media types in accordance with the invention.

In FIG. 7A, the user interface of Sam's communication device 13A is shown. The user interface shows Sam's favorite ongoing or current conversations, each defined by a attribute. In this example, Sam's conversations are designated by a person's name (i.e., "Jill Wright"), by a group ("Poker Buddies") or by topic ("Weekly Sales Meeting").

Figure 7B:
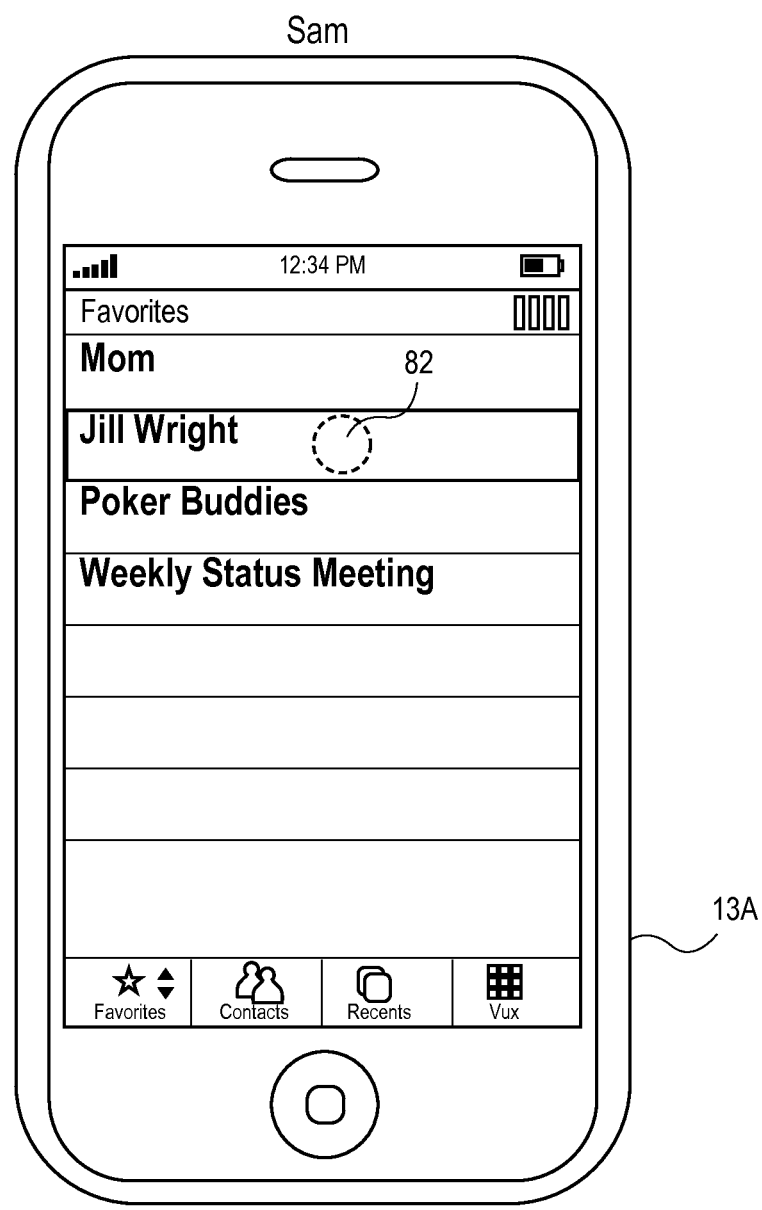

In FIG. 7B, Sam chooses his conversation with Jill. The selection may be made in a variety of ways, such as entering a voice command, entering keystrokes to select the conversation with Jill, or through a touch-screen by touching the screen next to Jill's name. In this example, the circle designated by reference number 82 appearing next to Jill's name is representative of the selection of the conversation with Jill Wright, regardless of the method used.

Figure 7C:
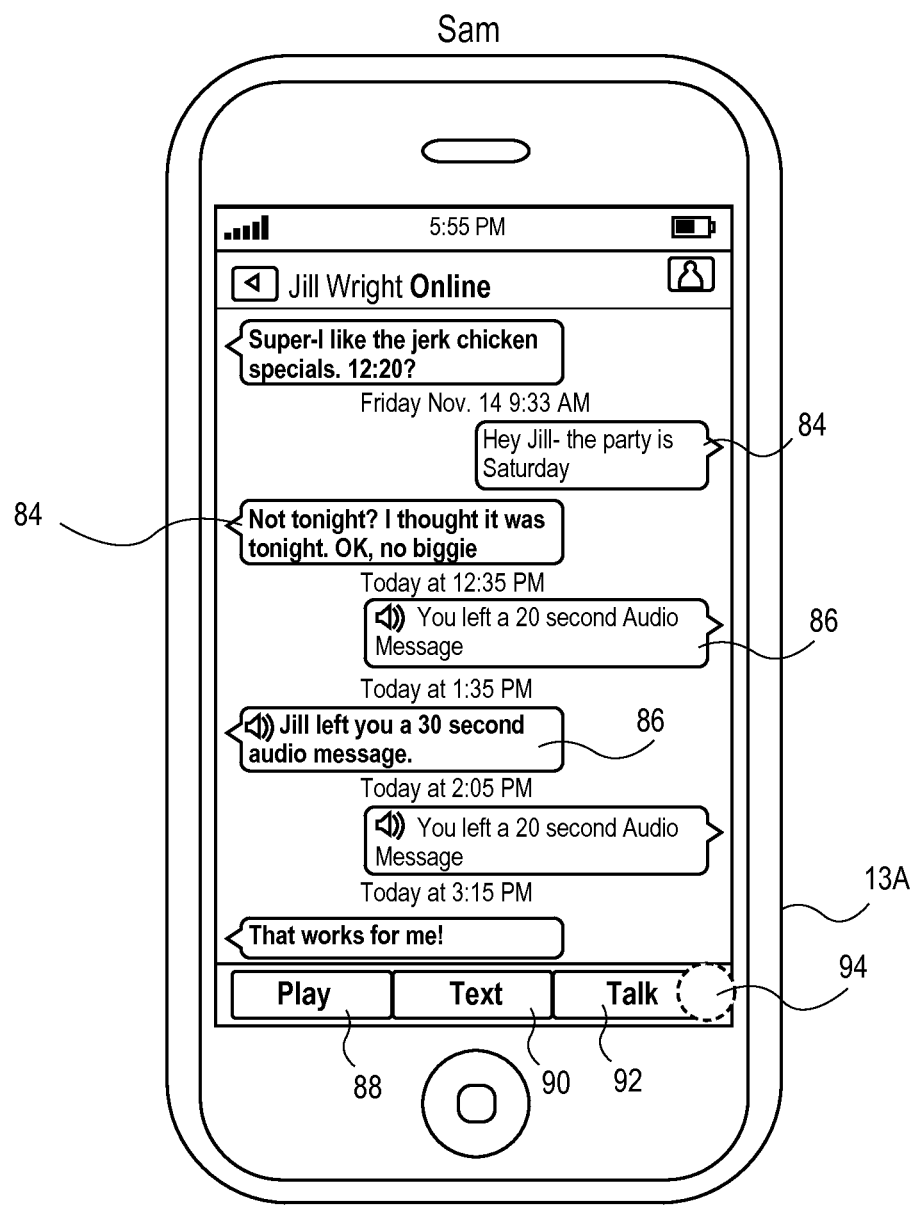

In FIG. 7C, the user interface on Sam's device is illustrated after the selection of the conversation with Jill Wright. In this example, it is assumed that the conversation is ongoing, and as a result, the history of the conversation with Jill, including each message of the conversation, is presented in time-indexed order. In this example, the messages are a mixture of both voice and text. With text messages 84, the actual message is retrieved from the PIMB 26 (or alternatively some other memory location for storing text messages) on Sam's device 13A and presented in a media bubble, along with the time the message was created and the person who created the message. With voice messages 86, an icon indicative of voice, such as a speaker, is provided for voice message bubbles, along with the creation time and the name of the person who created the message. When a voice message previously received is selected, the corresponding media of the message is retrieved from the PIMB 26 on Sam's device 13A and rendered. In various embodiments, the rendering may be automatic or require the selection of the "Play" icon 88. Sam may therefore scroll up and down the conversation history, reviewing selected or all of the conversation messages in the time-shifted mode at any arbitrary time. Previously messages may be selected and reviewed one at a time, or continuously in time-indexed order.

In this example, Sam has the option of sending to Jill either a text message by selecting the "Text" icon 90 or a voice message by selecting the "Talk" icon 92. In this example, Sam elects to talk to Jill by selecting the "Talk" icon 92, as represented by the circle 94 adjacent the "Talk" icon.

Figure 7D:
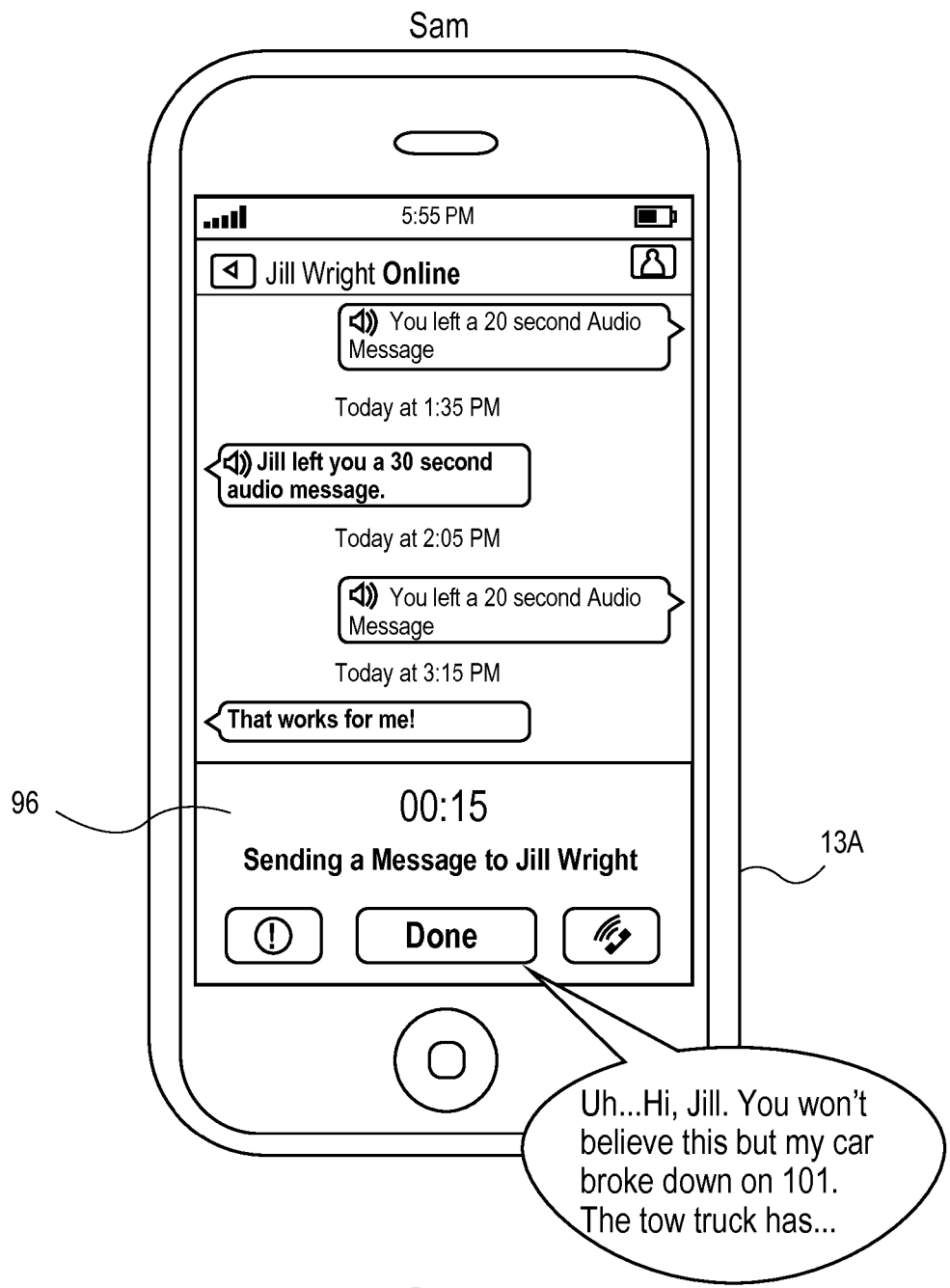

FIG. 7D shows the user interface on Sam's device after selecting the Talk icon 92. The display shows a window 96 appearing on the user interface of device 13A that indicates that Sam is "Sending a Message to Jill Wright" as well as a time indicator informing Sam of the duration of the message. In this example, Sam is informing Jill that his car broke down on highway 101.

Figure 7E:
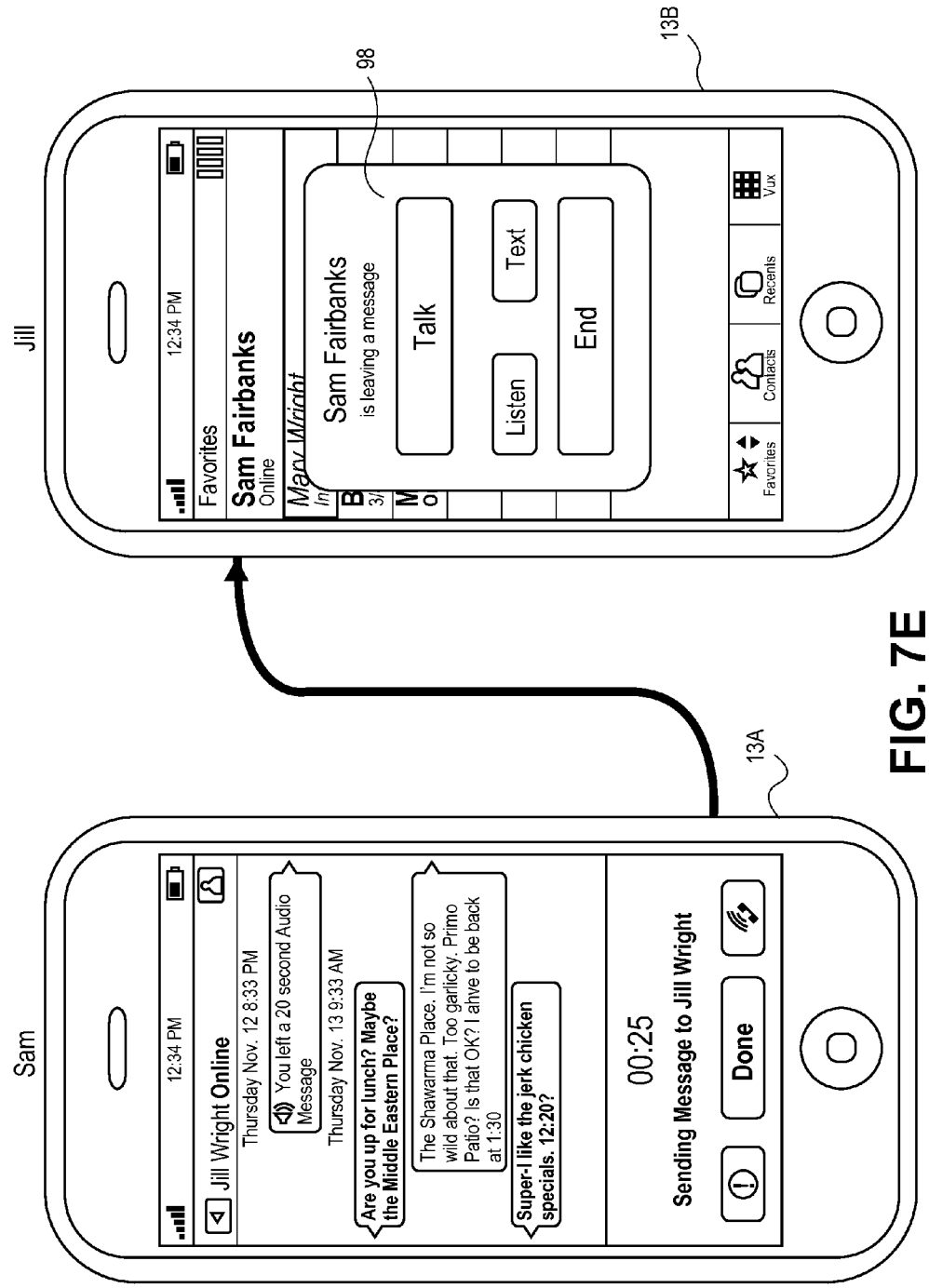

FIG. 7E shows the user interface of Jill's communication device 13B after receiving a notification that Sam is in the process of leaving her a message. In this example, the notification may be implemented in a variety of ways. In a soft notification example as illustrated, a pop-up message 98 appears on the display of Jill's communication device. The pop-up message 98 indicates that Sam is leaving a message and that he would like to speak directly with Jill. The pop-up message 98 provides Jill with a number of response options, including "Talk", which will allow Sam and Jill to engage the conversation in near real-time, "Listen" which will allow Jill to review the incoming message, or "Text" which allows Jill to create and send a text message back to Sam. The Talk, Listen and Text options are each described below with respect to FIG. 7F, FIGS. 7G through 7J, and FIG. 7K respectively.

In various embodiments, an audio notification, such as a beep or a ring tone, may also be used instead of or in cooperation with the pop-up window 98 to get Jill's attention. Audible notification is particularly useful when the device 13 is not immediately visible, for example, when in a pocket, briefcase or purse. In different embodiments, various levels of notice may be provided. In urgent situations, a high priority notice may be provided. In a more casual situation, a less urgent notice may be provided.

Figure 7F:
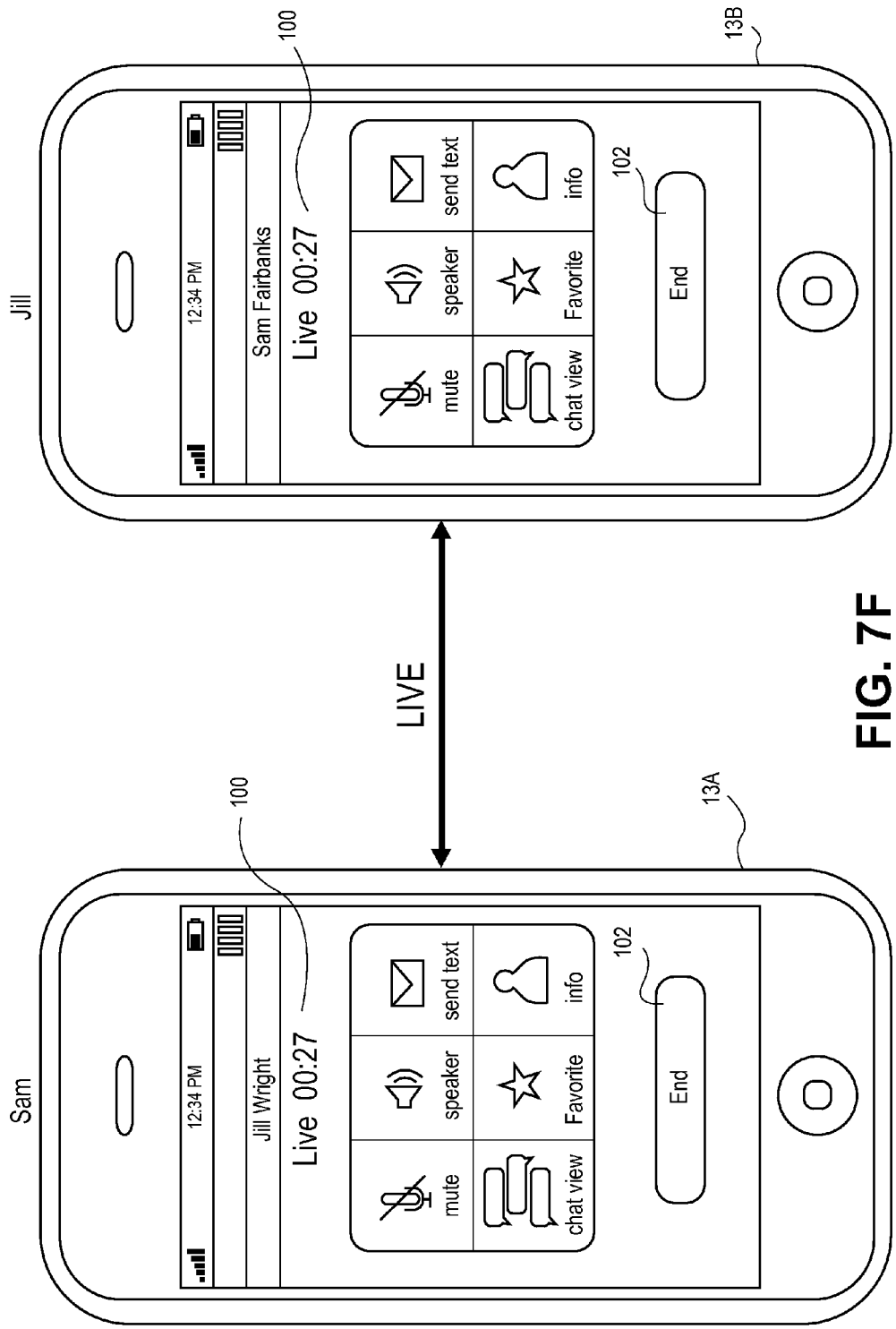

FIG. 7F shows the user interface on Jill's device 13B after selecting the "Talk" option. When this selection is made, the displays of both communication devices 13A and 13B shift into a state that lets each user know they are talking in the near real-time mode. For example, a "Live" message 100 along with time duration (e.g., "0:27") is displayed to each participant. As the two parties speak, their voice messages are time-indexed, stored in their respective PIMBs, and added to the historical record of the conversation. The conversation may continue in the near real-time (live) mode until either party selects the "End" function 102. Thereafter, Sam and Jill may resume the conversation at a later time, either in the real-time mode or the time-shifted messaging mode.

Figure 7G:
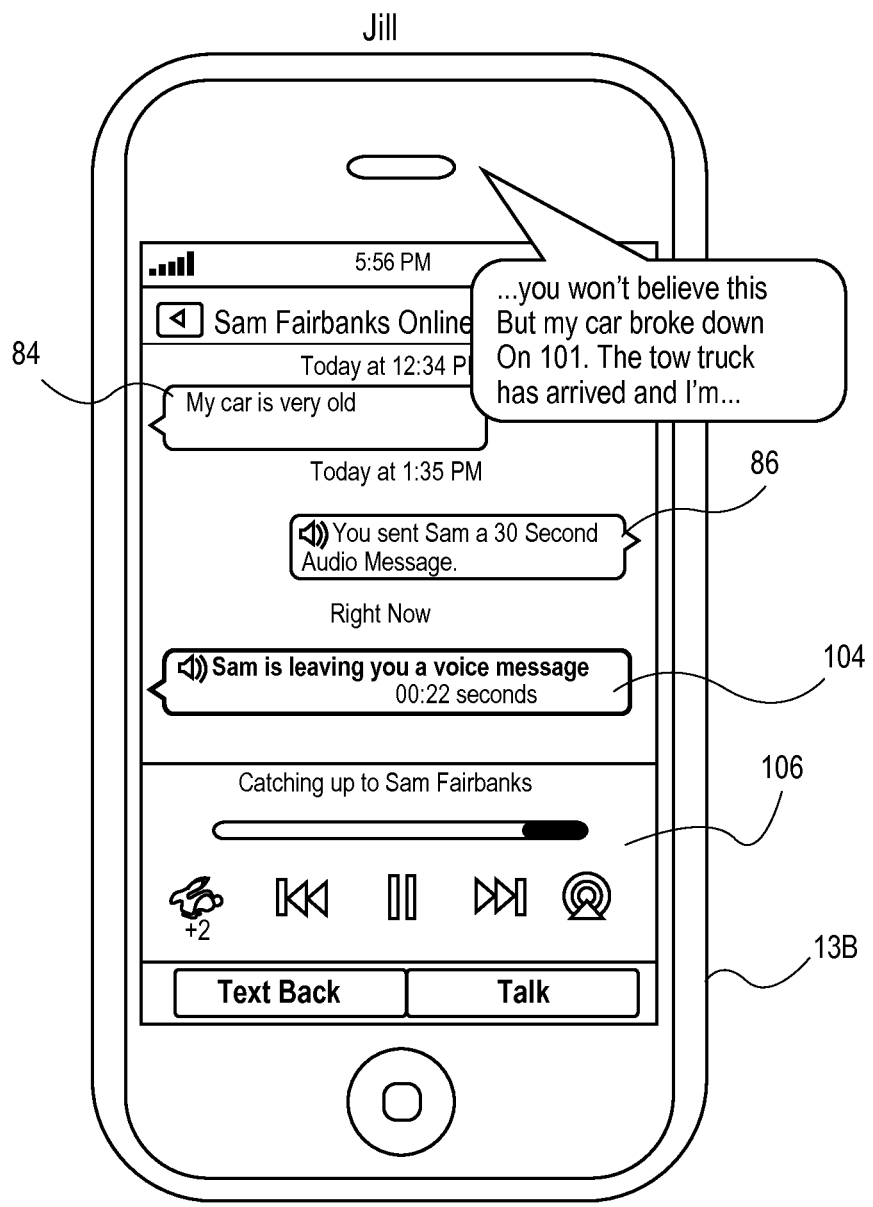

Alternatively, FIG. 7G shows the user interface on Jill's device 13B after selecting the "Listen" option, which allows Jill to listen to the incoming message without immediately engaging in a live conversation with Sam. The user interface on Jill's device 13B displays the previous text 84 and voice 86 messages of the conversation history, including a media bubble 104 indicating that Sam is currently leaving a message. In addition, a window 106 including a number of rendering options is included in the display. The rending options include a Catch-Up-To-Live (CTL) feature (designated by the rabbit icon), as well as icons for jumping backward, pausing and jumping forward. In this example Jill has elected the CTL feature to review Sam's message. With the CTL option, the media of Sam's message is rendered faster than it was originally encoded, allowing Jill to quickly review the message and eventually catch up to the live point of the conversation.

Figure 7H:
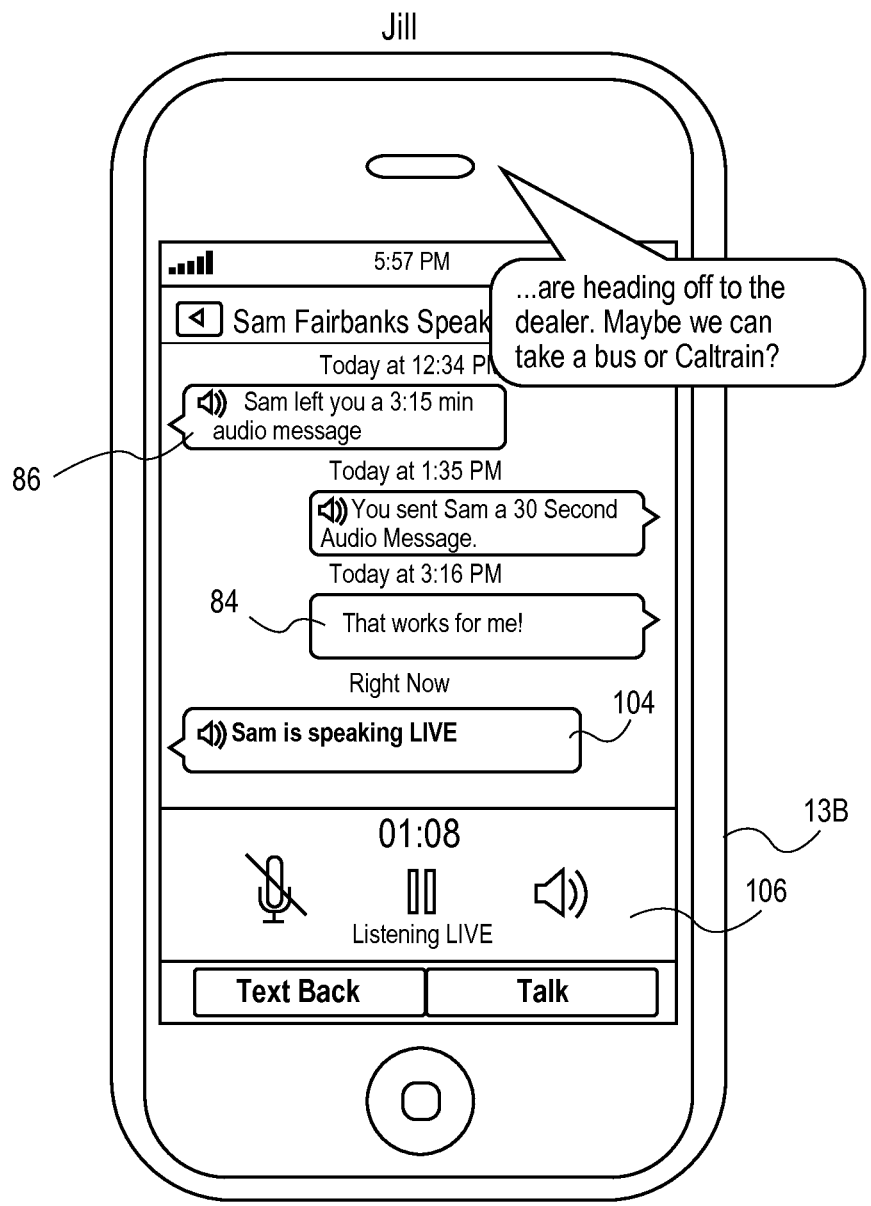

FIG. 7H shows the display on Jill's device 13B after she has caught up to the live point. At this moment, the display 106 on Jill's device transitions, indicating that she is now engaged with a live conversation with Sam. Thus in this example, Jill has seamlessly transitioned participation in the conversation with Sam from the time-shifted mode into the near real-time mode.

Figure 7I:
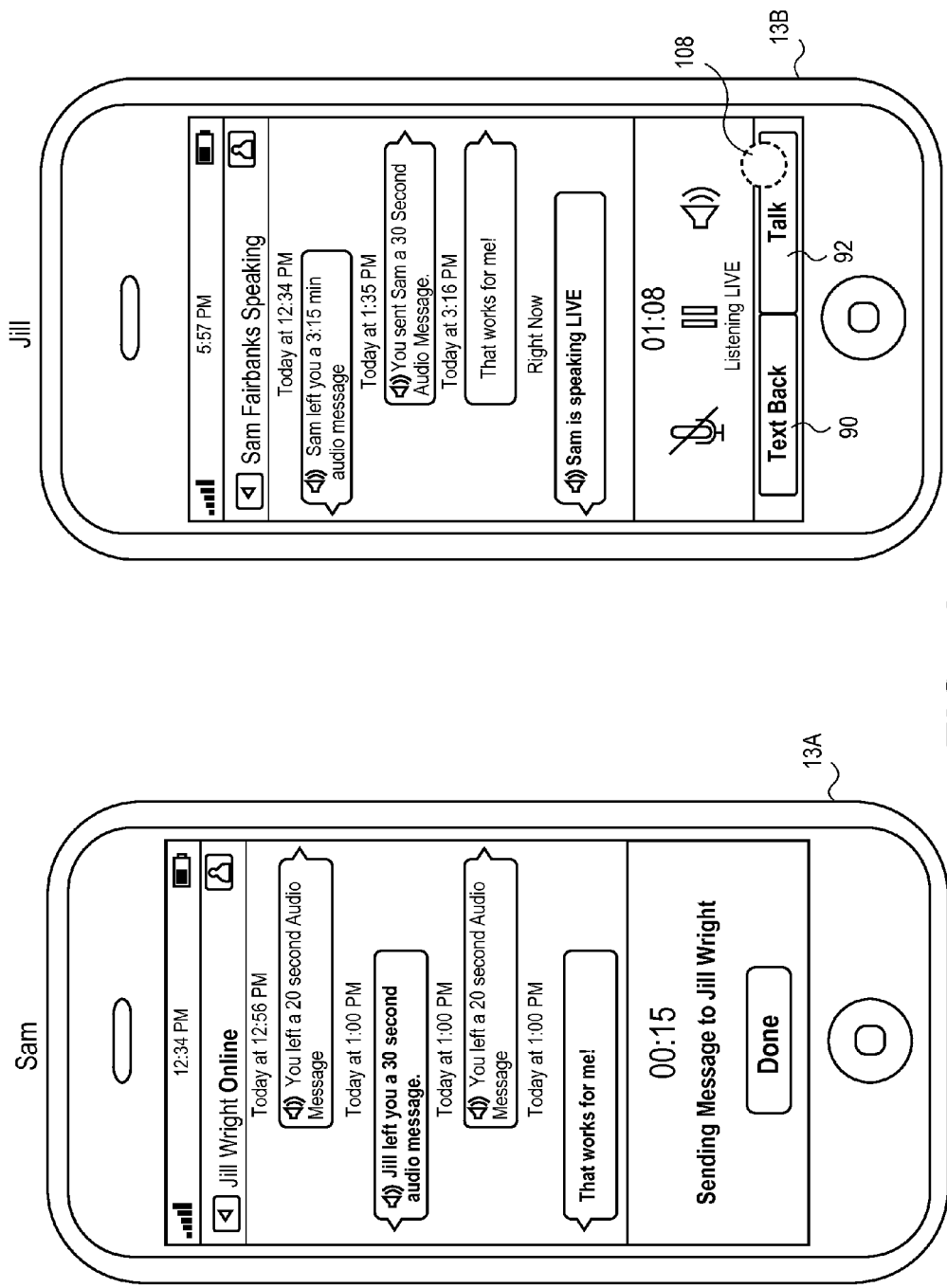

FIG. 7I shows the display of both Sam and Jill's user interfaces while Jill is listening live to the message from Sam.

Jill may elect to respond by either sending a text message by selecting the "Text" icon 90 or a voice message by selecting the "Talk" icon 92. In this example, Jill elects to talk, as signified by the circle 108 adjacent the "Talk" icon 92. In various embodiments, Jill may simply talk into her communication device, automatically implementing the talk function. Alternatively, some type of active input may be needed, such as touching the "Talk" icon 92 with an input device, such as a finger or stylus.

Figure 7J:
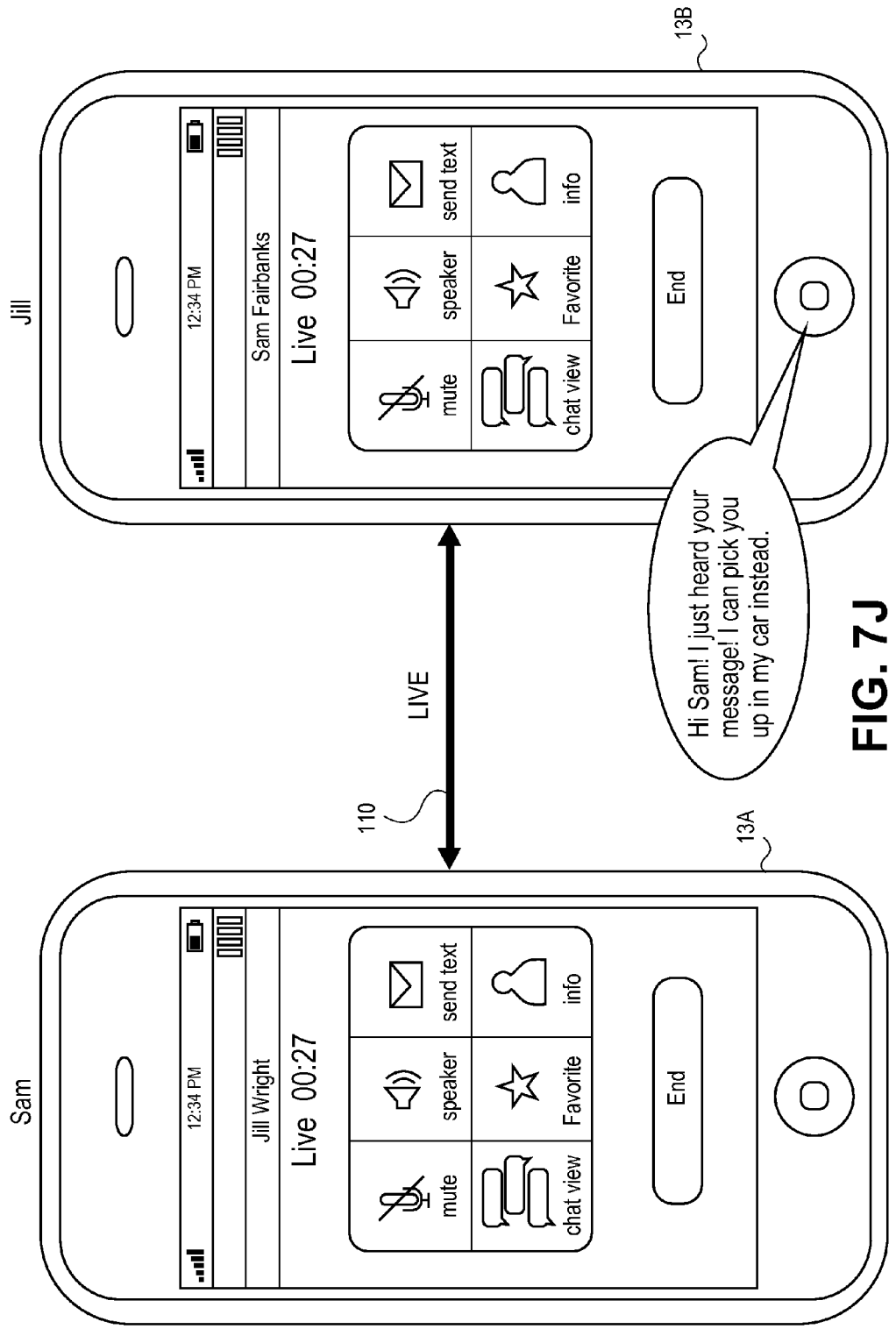

FIG. 7J shows the conversation between Sam and Jill in the live near real-time mode, as represented by the arrow 110 between the two communication devices 13A and 13B. In this example, Jill is sending a live message informing Sam that she will pick him up in her car. Sam and Jill may send live messages back and forth, similar to a conventional telephone conversation, while in the real-time mode.

Figure 7K:
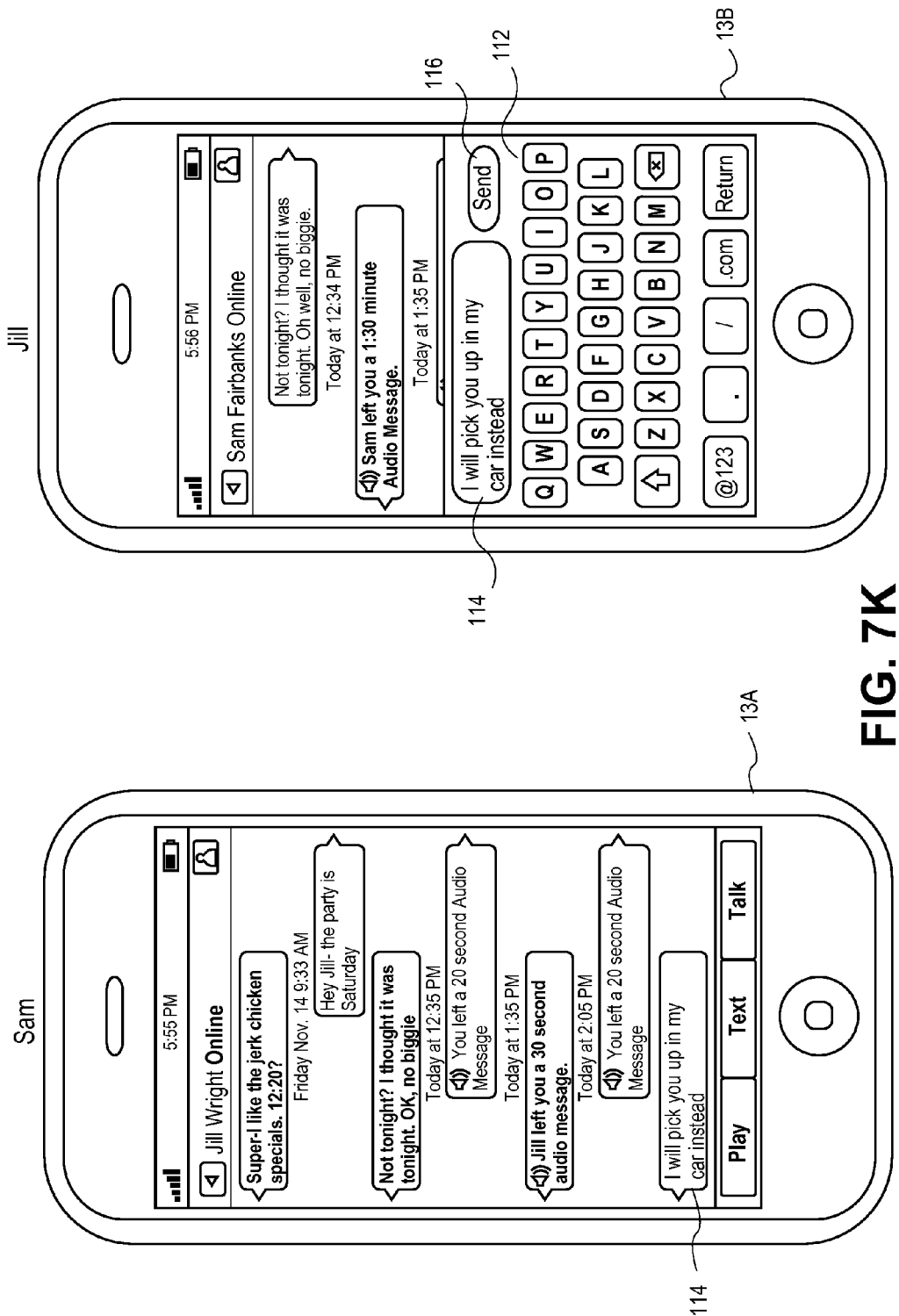

Alternatively, Jill also has the option of sending a text message back to Sam in reply to his incoming message by selecting the Text icon 90 as illustrated in FIG. 7I. When the Text option is selected, the user interface of Jill's device 13B is shown in FIG. 7K, displaying a keyboard 112 for typing a text message. After the text message is transmitted, it is displayed in a text media bubble 114 in the conversation history appearing on Sam's device 13A. In various embodiments, the text message may be transmitted keystroke-by-keystroke, or only after the typing of the message is completed and transmitted after initiating a send function.

As Sam and Jill engage in the conversation in the real-time mode, live voice messages are sent back and forth between the two parties. At any point while the conversation is in the near real-time mode, one or both parties may opt out of live participation. At this point, the parties may still communication, sending either voice or text messages to each other, which may then be reviewed by the recipient in the time-shifted mode. The conversation therefore does not end when live communication stops, but rather, seamlessly transitions from the near real-time mode to the time-shifted mode. At any point, Sam and Jill may again elect to resume the conversation live and seamlessly transition back to the near real-time mode.

It should be noted that the various messages, icons and notifications mentioned above with regard to FIGS. 7A through 7K are merely exemplary. A wide variety different messages, icons and notifications, including audible, visual, text or icon based indicators may be used, either alone or in combination. In addition, the selection of the various icons and functions, and the scrolling through the various messages of a conversation, may be implemented in a number of ways, such as using an input device such as a finger stylus or pointer, using voice commands, or any other screen navigation, input or selection method. Those provided and described herein should therefore be considered as representative and not limiting the scope of the invention in any regard.

It should also be understood that the present invention may be applied to any communication system, including mobile or cellular phone networks, police, fire, military taxi, and first responder type communication systems, legacy circuit-based networks, VoIP networks, the Internet, or any combination thereof.

In various embodiments, devices 13 may be one of the following: land-line phone, wireless phone, cellular phone, satellite phone, computer, radio, server, satellite radio, tactical radio or tactical phone The types of media besides voice that may be generated on a communication device 13 and transmitted may further include video, text, sensor data, position or GPS information, radio signals, or a combination thereof.

The aforementioned description is described in relation to a wired or wireless communication devices 13. It should be understood that the same techniques and principles of the present invention also apply to the server hops 16 between a sending and a receiving pair in either a wireless or wired network. In the case of a server hop 16, media is typically not generated on these devices. Rather these devices receive media from another source, such as a phone, radio or another hop on the network, and are responsible for optionally persistently storing the received media and forwarding the media on to the next hop or the recipient as described above.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A non-transitory computer readable medium including computer code intended for execution on a communication device connected to a network, the code configured to perform the following when executed on the communication device:

enable the communication device to participate in a conversation conducted over the network with a remote participant, the conversation including a bi-directional exchange between the participants of incoming and outgoing messages that include voice media;

progressively store the incoming and outgoing messages of the conversation on the communication device:

(a) as the voice media of the outgoing messages is created on the communication device; and (b) as the voice media of the incoming messages is received over the network from the remote participant of the conversation;

display on the communication device the message history of the conversation, the message history including visual representations corresponding to the incoming and outgoing messages respectively;

provide rendering options on the communication device to selectively render the incoming messages of the conversation in a near real-time mode as the voice media of the incoming messages is progressively received over the network and out of storage in a time-shifted mode;

selectively transition participation in the conversation between the near real-time mode when progressively rendering the voice media of the incoming messages as the voice media is progressively received over the network and in the time-shifted messaging mode when rendering the voice media of the incoming messages out of storage; and provide a select-to-talk function for generating the outgoing messages of the conversation on the communication device, the select-to-talk function, when implemented, configured to:

(c) generate one of the outgoing messages pertaining to the conversation; and (d) progressively transmit the voice media of the one outgoing message to the remote participant of the conversation as the voice media is created and progressively stored on the communication device.

2. The non-transitory computer readable medium including the computer code of claim 1, wherein the select-to-talk function is further configured to transmit the voice media of the one outgoing message at a rate commensurate with the bandwidth capacity on the network when the voice media is created.

3. The non-transitory computer readable medium including the computer code of claim 1, wherein the select-to-talk function is further configured to transmit the voice media of the one outgoing message from storage on the communication device if:

(e) the voice media of one outgoing message is created when the communication device was disconnected from the network; and (f) after the communication device reconnects to the network.

4. The non-transitory computer readable medium including the computer code of claim 1, wherein the select-to-talk function is further configured to transmit the voice media of the one outgoing message from storage on the communication device, at a rate as fast as conditions on the network permit, when conditions on the network do not permit the transmission of the voice media as it is created.

5. The non-transitory computer readable medium including the computer code of claim 1, wherein the select-to-talk function is further configured to use a transmission protocol capable of:

(i) supporting near real-time communication so that the remote participant of the conversation may selectively review the voice media of the one outgoing message in near real-time; and (ii) guaranteeing the delivery of the voice media of the one outgoing message to the remote participant of the conversation.

6. The non-transitory computer readable medium including the computer code of claim 1, wherein the select-to-talk function is further configured to use a transmission protocol that guarantees delivery of a complete copy of the voice media of the one outgoing message to the remote participant of the conversation.

7. The non-transitory computer readable medium including the computer code of claim 1, wherein the select-to-talk function is further configured to use media packets embedded into transport packets to transport the voice media of the outgoing messages to the remote participant of the conversation.

8. The non-transitory computer readable medium including the computer code of claim 7, wherein the transport packets comprise Internet Protocol (IP) packets.

9. The non-transitory computer readable medium including the computer code of claim 1, wherein the incoming and outgoing messages of the conversation are associated by an attribute, the attribute comprising one of the following:

(i) a name of a participant of the conversation;

(ii) a topic of the conversation;

(iii) a subject defining the conversation; or (iv) a group identifier identifying the participants of the conversation.

10. The non-transitory computer readable medium including the computer code of claim 1, further configured to display a list of active conversations on the communication device.

11. The non-transitory computer readable medium including the computer code of claim 10, further configured to enable a user of the communication device to select the conversation among the list of active conversations for participation.

12. The non-transitory computer readable medium including the computer code of claim 1, wherein the visual representations of the incoming and outgoing messages in the conversation history are displayed in the time order in which the incoming and outgoing messages were created and added to the conversation respectively.

13. The non-transitory computer readable medium including the computer code of claim 1, wherein the visual representations each include a date and time indicator indicative of when the voice media of the corresponding incoming and outgoing messages were created respectively.

14. The non-transitory computer readable medium including the computer code of claim 1, wherein the visual representations each include an indicator indicative of the name of the participant of the conversation that created the voice media of the incoming and outgoing messages respectively.

15. The non-transitory computer readable medium including the computer code of claim 1, wherein the incoming and the outgoing messages of the conversation are further configured to include video media.

16. The non-transitory computer readable medium including the computer code of claim 1, further configured to display in the message history text messages that are exchanged during the conversation.

17. The non-transitory computer readable medium including the computer code of claim 1, further configured to display in the message history photos that are exchanged during the conversation.

18. The non-transitory computer readable medium including the computer code of claim 1, further configured to include in the message history video exchanged during the conversation.

19. The non-transitory computer readable medium including the computer code of claim 1, further configured to support synchronous communication among the participants of the conversation.

20. The non-transitory computer readable medium including the computer code of claim 1, further configured to support asynchronous communication among the participants of the conversation.

21. The non-transitory computer readable medium including the computer code of claim 1, further configured to operate in a full-duplex mode when transmitting an outgoing message and receiving an incoming message at approximately the same time.

22. The non-transitory computer readable medium including the computer code of claim 1, wherein the select-to-talk function is further configured to address the one outgoing message to the remote participant of the conversation by using an identifier embedded in the message and associated with the remote participant.

23. The non-transitory computer readable medium including the computer code of claim 1, wherein the one outgoing message is addressed to the remote participant by a user of the communication device using a human-readable identifier.

24. The non-transitory computer readable medium including the computer code of claim 22, wherein the identifier is a non-IP address identifier that is resolved into an IP-address that corresponds to a remote communication device associated with the remote participant of the conversation.

25. The non-transitory computer readable medium including the computer code of claim 24, wherein the IP-address is resolved into a physical address for delivery of the one outgoing message over the network to the remote communication device.

26. The non-transitory computer readable medium including the computer code of claim 1, wherein the select-to-talk function is implemented by selecting a push-to-talk feature on the communication device.

27. The non-transitory computer readable medium including the computer code of claim 26, wherein the push-to-talk feature is implemented by selecting a push-to-talk icon on a display screen on the communication device.

28. The non-transitory computer readable medium including the computer code of claim 1, further comprising code for generating a text icon on a display screen of the communication device, the text icon enabling the contribution of text-based messages to the conversation when selected.

29. The non-transitory computer readable medium including the computer code of claim 1, further comprising code for generating a photo or video icon on a display screen of the communication device, the photo or video icon enabling the contribution of a photo or video to the conversation respectively.

30. The non-transitory computer readable medium including the computer code of claim 1, wherein the communication device configured to execute the code comprises one of the following:
    (i) a land-line phone;
    (ii) a wireless phone;
    (iii) a cellular phone;
    (iv) a mobile phone;
    (v) a satellite phone;
    (vi) a computer;
    (vii) a radio;
    (viii) a tactical radio; or
    (ix) a satellite radio.

* * * * *